(12) United States Patent
Huang et al.

(10) Patent No.: US 12,526,021 B2
(45) Date of Patent: Jan. 13, 2026

(54) SCHEME SELECTION FOR FEEDING BACK CHANNEL STATE INFORMATION

(71) Applicant: QUALCOMM Incorporated, San Diego, CA (US)

(72) Inventors: Chu-Hsiang Huang, San Diego, CA (US); Jae Ho Ryu, San Diego, CA (US); Changhwan Park, San Diego, CA (US); Carlos Cabrera Mercader, Cardiff, CA (US)

(*) Notice: Subject to any disclaimer, the term of this patent is extended or adjusted under 35 U.S.C. 154(b) by 360 days.

(21) Appl. No.: 18/190,052

(22) Filed: Mar. 24, 2023

(65) Prior Publication Data
US 2024/0322877 A1    Sep. 26, 2024

(51) Int. Cl.
*H04B 7/06* (2006.01)

(52) U.S. Cl.
CPC ......... *H04B 7/0626* (2013.01); *H04B 7/0636* (2013.01)

(58) Field of Classification Search
CPC ....... H04W 24/02; H04W 24/10; H04W 8/22; H04W 72/23; H04B 17/391; G06F 11/34
See application file for complete search history.

(56) References Cited

U.S. PATENT DOCUMENTS

| 2022/0360973 A1* | 11/2022 | Zhu | H04B 7/0626 |
| 2024/0097764 A1* | 3/2024 | Jeon | H04B 7/0626 |
| 2024/0154670 A1* | 5/2024 | Lee | H04B 7/0658 |

FOREIGN PATENT DOCUMENTS

| CN | 115280833 A | 11/2022 |
| WO | 2022133866 A1 | 6/2022 |

OTHER PUBLICATIONS

International Search Report and Written Opinion—PCT/US2024/012827—ISA/EPO—May 31, 2024.

* cited by examiner

*Primary Examiner* — Iqbal Zaidi

(57) ABSTRACT

An apparatus may be configured to receive an instruction indicating one of a machine-learning (ML) channel state information (CSI) feedback scheme associated with a first spectral efficiency or a non-ML CSI feedback scheme associated with a second spectral efficiency; and report the CSI feedback to a network node using the indicated one of the ML CSI feedback scheme or the non-ML CSI feedback scheme. Another apparatus may be configured to select one an ML CSI feedback scheme associated with a first spectral efficiency or a non-ML CSI feedback scheme associated with a second spectral efficiency; transmit, to the UE, an instruction indicating the selected one of the ML CSI feedback scheme or the non-ML CSI feedback scheme; and receive, from the UE, the CSI feedback that is associated with the selected one of the ML CSI feedback scheme or the non-ML CSI feedback scheme.

38 Claims, 10 Drawing Sheets

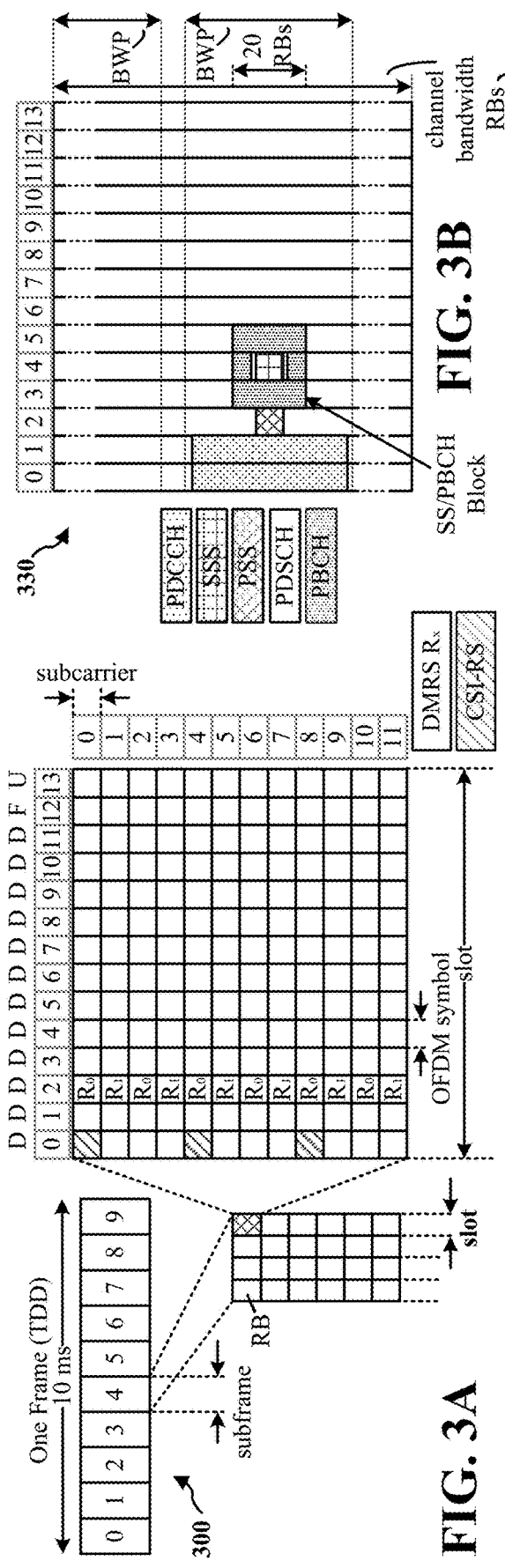
FIG. 3A
FIG. 3B
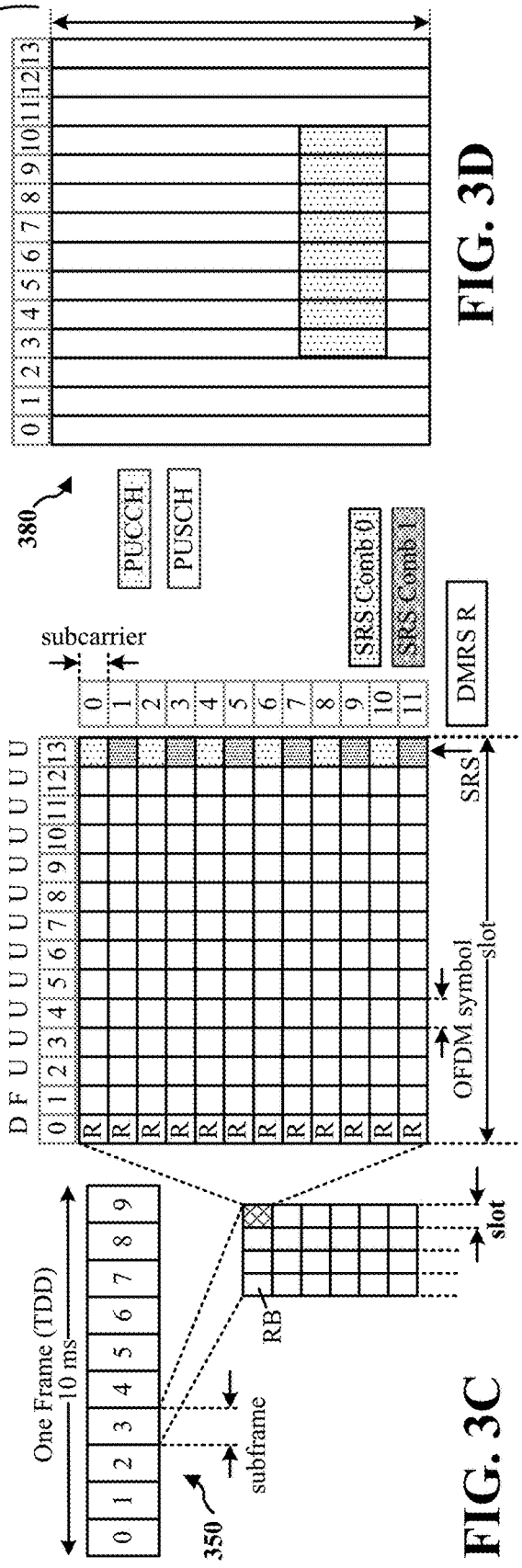
FIG. 3C
FIG. 3D

SCHEME SELECTION FOR FEEDING BACK CHANNEL STATE INFORMATION

BACKGROUND

Technical Field

The present disclosure generally relates to communication systems, and more particularly, to selection of a feedback scheme for channel state information that is either assisted by a machine-learning model or unassisted by a machine-learning model.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE) or a component thereof. The apparatus may be configured to receive, from a network node, an instruction indicating one of a machine-learning (ML) channel state information (CSI) feedback scheme associated with a first spectral efficiency or a non-ML CSI feedback scheme associated with a second spectral efficiency to be used for CSI feedback; and report the CSI feedback to the network node using the indicated one of the ML CSI feedback scheme or the non-ML CSI feedback scheme.

In another aspect of the disclosure, another method, another computer-readable medium, and another apparatus are provided. The other apparatus may be a network node or a component thereof. The other apparatus may be configured to select one an ML CSI feedback scheme associated with a first spectral efficiency or a non-ML CSI feedback scheme associated with a second spectral efficiency to be used for CSI feedback by a UE; transmit, to the UE, an instruction indicating the selected one of the ML CSI feedback scheme or the non-ML CSI feedback scheme; and receive, from the UE, the CSI feedback that is associated with the selected one of the ML CSI feedback scheme or the non-ML CSI feedback scheme.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 3A is a diagram illustrating an example of a first frame, in accordance with various aspects of the present disclosure.

FIG. 3B is a diagram illustrating an example of downlink channels within a subframe, in accordance with various aspects of the present disclosure.

FIG. 3C is a diagram illustrating an example of a second frame, in accordance with various aspects of the present disclosure.

FIG. 3D is a diagram illustrating an example of uplink channels within a subframe, in accordance with various aspects of the present disclosure.

DETAILED DESCRIPTION

Figure 1:
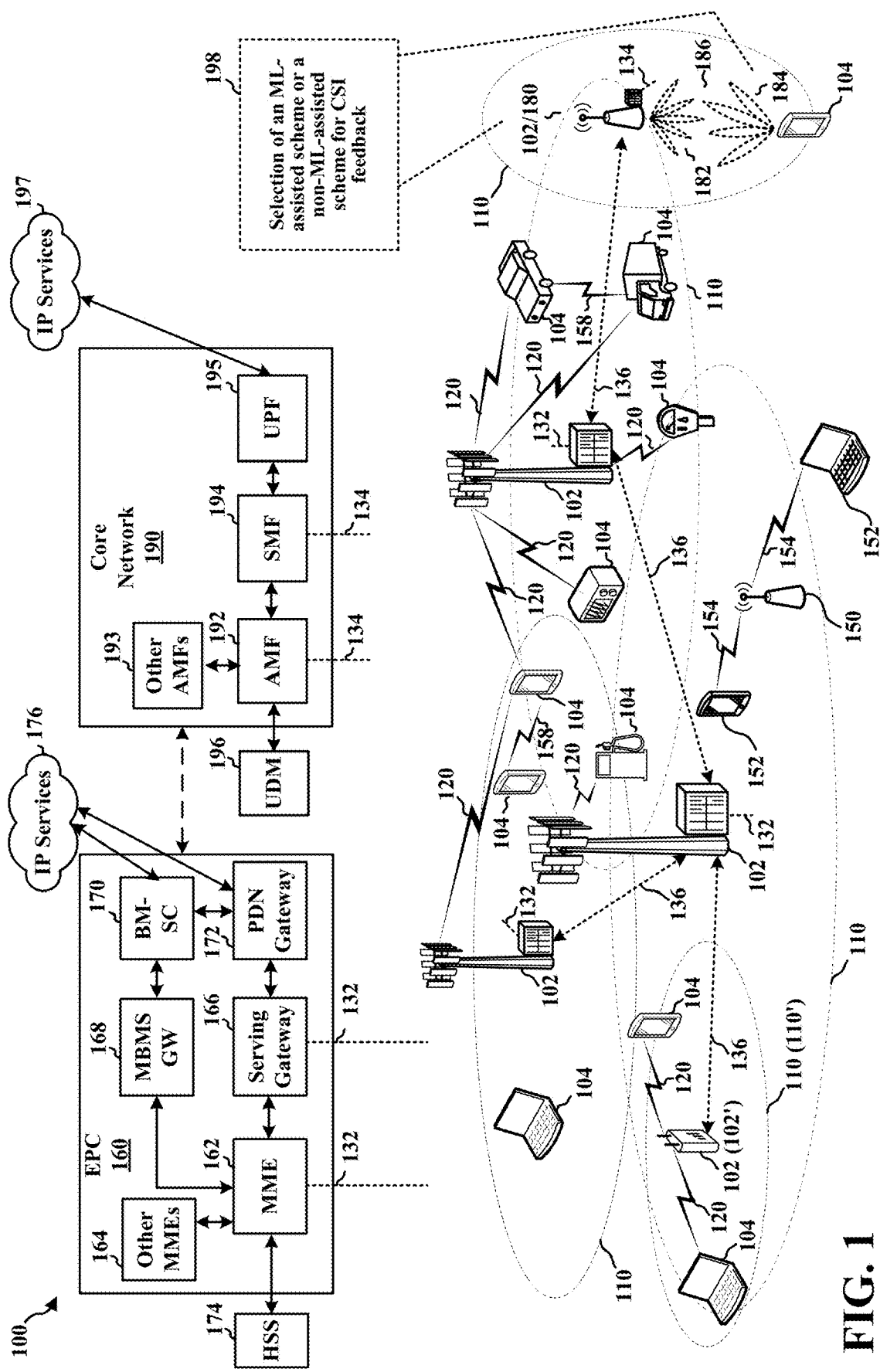
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, the concepts and related aspects described in the present disclosure may be implemented in the absence of some or all of such specific details. In some instances, well-known structures, components, and the like are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, computer-executable code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or computer-executable code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer-executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells, such as high power cellular base stations, and/or small cells, such as low power cellular base stations (including femtocells, picocells, and microcells).

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR), which may be collectively referred to as the Next Generation Radio Access Network (RAN) (NG-RAN), may interface with a core network 190 through second backhaul links 134. In addition to other functions, the base stations 102 may perform one or more of: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, Multimedia Broadcast Multicast Service (MBMS), subscriber and equipment trace, RAN information management (RIM), paging, positioning, and delivery of warning messages.

In some aspects, the base stations 102 may communicate directly or indirectly (e.g., through the EPC 160 or core network 190) with each other over third backhaul links 136 (e.g., X2 interface). The first backhaul links 132, the second backhaul links 134, and the third backhaul links 136 may be wired, wireless, or some combination thereof. At least some of the base stations 102 may be configured for integrated access and backhaul (IAB). Accordingly, such base stations may wirelessly communicate with other base stations, which also may be configured for IAB.

At least some of the base stations 102 configured for IAB may have a split architecture including multiple units, some or all of which may be collocated or distributed and which may communicate with one another. For example, FIG. 2, infra, illustrates an example disaggregated base station 200 architecture that includes at least one of a central unit (CU) 210, a distributed unit (DU) 230, a radio unit (RU) 240, a remote radio head (RRH), a remote unit, and/or another similar unit configured to implement one or more layers of a radio protocol stack.

The base stations 102 may wirelessly communicate with the UEs 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.).

A UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Each of the base stations 102 may provide communication coverage for a respective geographic coverage area 110, which may also be referred to as a "cell." Potentially, two or more geographic coverage areas 110 may at least partially overlap with one another, or one of the geographic coverage areas 110 may contain another of the geographic coverage areas. For example, the small cell 102' may have a coverage area 110' that overlaps with the coverage area 110 of one or more macro base stations 102. A network that includes both small cells and macrocells may be known as a heterogeneous network. A heterogeneous network may also include Home Evolved Node Bs (eNBs) (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use multiple-input and multiple-output (MIMO) antenna technology, including spatial multiplexing, beamforming, and/or transmit diversity. Wireless links or radio links may be on one or more carriers, or component carriers (CCs). The base stations 102 and/or UEs 104 may use spectrum up to Y megahertz (MHz) (e.g., Y may be equal to or approximately equal to 5, 10, 15, 20, 100, 400, etc.) bandwidth per carrier allocated in a carrier aggregation of up to a total of Yx MHZ (e.g., x CCs) used for transmission in each direction. The CCs may or may not be adjacent to each other. Allocation of CCs may be asymmetric with respect to downlink and uplink (e.g., more or fewer CCs may be allocated for downlink than for uplink).

The CCs may include a primary CC and one or more secondary CCs. A primary CC may be referred to as a primary cell (PCell) and each secondary CC may be referred to as a secondary cell (SCell). The PCell may also be referred to as a "serving cell" when the UE is known both to a base station at the access network level and to at least one core network entity (e.g., AMF and/or MME) at the core network level, and the UE may be configured to receive downlink control information in the access network, such as where the UE is in a radio resource control (RRC) Connected state. In some instances in which carrier aggregation is configured for the UE, each of the PCell and the one or more SCells may be a serving cell.

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHZ or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHZ). The frequencies between FR1 and FR2 are often referred to as mid-band frequencies. Although a portion of FR1 is greater than 6 GHZ, FRI is often referred to (interchangeably) as a "sub-6 GHz" band in various documents and articles. A similar nomenclature issue sometimes occurs with regard to FR2, which is often referred to (interchangeably) as a "millimeter wave" (or "mmWave" or simply "mmW") band in documents and articles, despite being different from the extremely high frequency (EHF) band (30 GHz-300 GHz) which is identified by the International Telecommunications Union (ITU) as a "millimeter wave" band. In some aspects, "mmW" or "near-mmW" may additionally or alternatively refer to a 60 GHz frequency range, which may include multiple channels outside of 60 GHz. For example, a 60 GHz frequency band may refer to a set of channels spanning from 57.24 GHz to 70.2 GHz.

In view of the foregoing, unless specifically stated otherwise, the term "sub-6 GHz," "sub-7 GHZ," and the like, to the extent used herein, may broadly represent frequencies that may be less than 6 GHZ, frequencies that may be less than 7 GHZ, frequencies that may be within FR1, and/or frequencies that may include mid-band frequencies. Further, unless specifically stated otherwise, the term "millimeter wave" and other similar references, to the extent used herein, may broadly represent frequencies that may include mid-band frequencies, frequencies that may be within FR2, and/or frequencies that may be within the EHF band.

A base station 102 may be implemented as a macro base station providing a large cell or may be implemented as a small cell 102' having a small cell coverage area. Some base stations 102 may operate in a traditional sub-6 GHZ (or sub-7 GHZ) spectrum, in mmW frequencies, and/or near-mmW frequencies in communication with the UE 104. When such a base station operates in mmW or near-mmW frequencies, the base station may be referred to as a mmW base station 180. The mmW base station 180 may utilize beamforming 186 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182. The UE 104 may receive the beamformed signal from the base station 180 in one or more receive directions 184. The UE 104 may also transmit a beamformed signal to the base station 180 in one or more transmit directions. The base station 180 may receive the beamformed signal from the UE 104 in one or more receive directions. One or both of the base station 180 and/or the UE 104 may perform beam training to determine the best receive and/or transmit directions for the one or both of the base station 180 and/or UE 104. The transmit and receive directions for the base station 180 may or may not be the same. The transmit and receive directions for the UE 104 may or may not be the same.

In various different aspects, one or more of the base stations 102/180 may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology.

In some aspects, one or more of the base stations 102/180 may be connected to the EPC 160 and may provide respective access points to the EPC 160 for one or more of the UEs 104. The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, with the Serving Gateway 166 being connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a Packet Switch (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

In some other aspects, one or more of the base stations 102/180 may be connected to the core network 190 and may provide respective access points to the core network 190 for one or more of the UEs 104. The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QOS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a PS Streaming Service, and/or other IP services.

In certain aspects, a UE 104 may be configured to receive, from a base station 102/180, an instruction indicating a selection 198 of one of a machine-learning (ML) channel state information (CSI) feedback scheme associated with a first spectral efficiency or a non-ML CSI feedback scheme associated with a second spectral efficiency to be used for CSI feedback. The UE 104 may report the CSI feedback to the base station 102/180 using the indicated one of the ML CSI feedback scheme or the non-ML CSI feedback scheme.

Correspondingly, the base station 102/180 may be configured for selection 198 of one of the ML CSI feedback scheme associated with the first spectral efficiency or the non-ML CSI feedback scheme associated with the second spectral efficiency to be used for CSI feedback by a UE 104. The base station 102/180 may transmit, to the UE 104, an instruction indicating the selection 198 of one of the ML CSI feedback scheme or the non-ML CSI feedback scheme. The base station 102/180 may receive, from the UE 104, the CSI feedback that is associated with the selected one of the ML CSI feedback scheme or the non-ML CSI feedback scheme.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Figure 2:
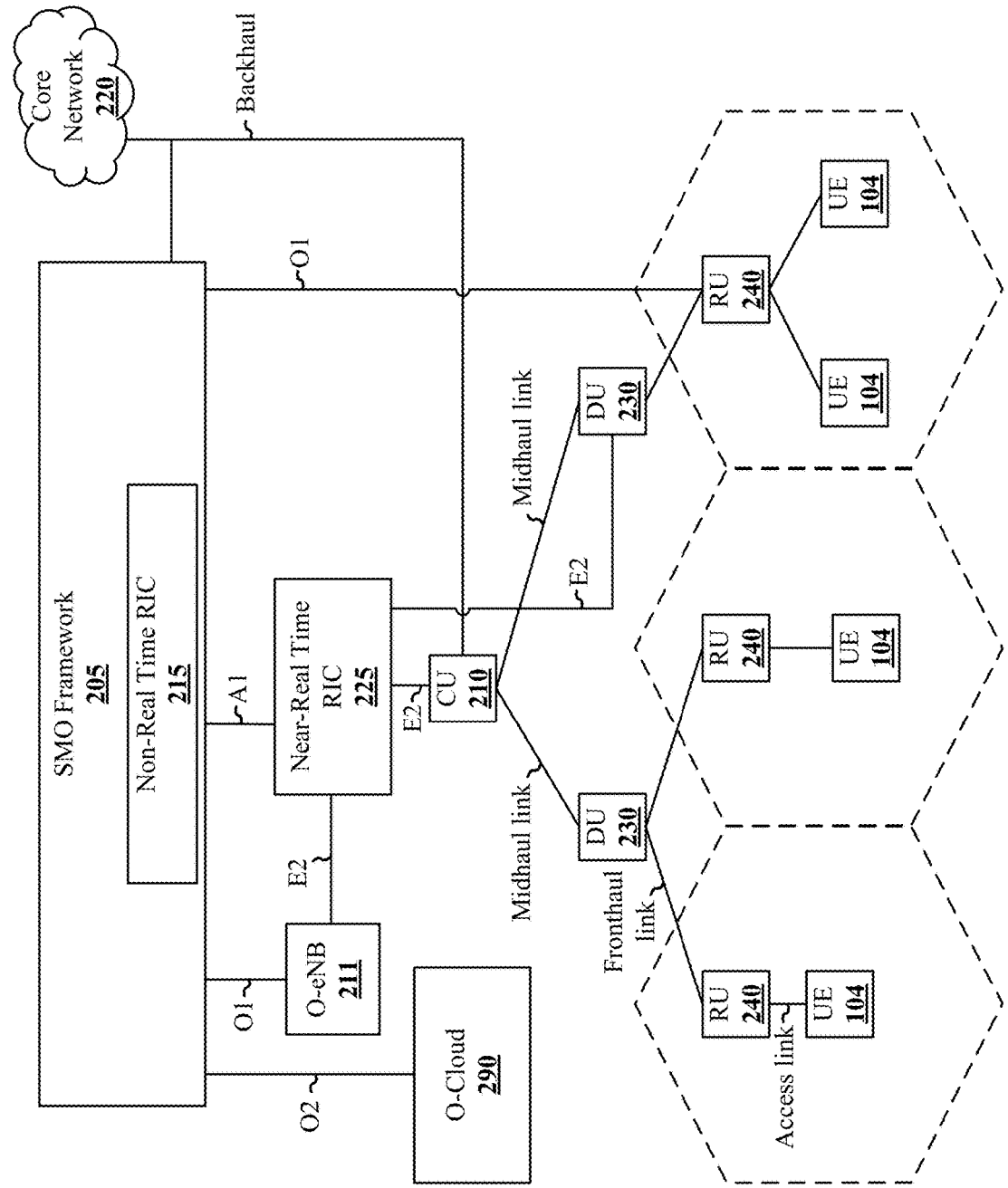
FIG. 2 is a diagram illustrating an example disaggregated base station architecture.

FIG. 2 shows a diagram illustrating an example disaggregated base station 200 architecture. Deployment of communication systems, such as 5G NR systems, may be arranged in multiple manners with various components or constituent parts. In a 5G NR system, or network, a network node, a network entity, a mobility element of a network, a RAN) node, a core network node, a network element, or a network equipment, such as a base station, or one or more units (or one or more components) performing base station functionality, may be implemented in an aggregated or disaggregated architecture. For example, a base station (or network node) may be implemented as an aggregated base station (also known as a standalone base station or a monolithic base station) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU).

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station 200 architecture may include one or more CUs 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more DUs 230 via respective midhaul links, such as an F1 interface. The DUs 230 may communicate with one or more RUs 240 via respective fronthaul links. The RUs 240 may communicate with respective UEs 104 via one or more radio frequency (RF) access links. In some implementations, the UE 104 may be simultaneously served by multiple RUs 240.

Each of the units, i.e., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 210 may host one or more higher layer control functions. Such control functions can include RRC, packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-CNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

FIG. 3A is a diagram illustrating an example of a first subframe 300 within a 5G NR frame structure. FIG. 3B is a diagram illustrating an example of downlink channels within a 5G NR subframe 330. FIG. 3C is a diagram illustrating an example of a second subframe 350 within a 5G NR frame structure. FIG. 3D is a diagram illustrating an example of uplink channels within a 5G NR subframe 380. The 5G NR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 3A and 3C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 34 (with mostly uplink). While subframes 3, 4 are shown with slot formats 34, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through downlink control information (DCI), or semi-statically/statically through RRC signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) orthogonal frequency-division multiplexing (OFDM) (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology u, there are 14 symbols/slot and 24 slots/subframe. The subcarrier spacing and symbol length/duration are a function of the numerology. The subcarrier spacing may be equal to $2^{\mu}*15$ kilohertz (kHz), where µ is the numerology 0 to 4. As such, the numerology µ=0 has a subcarrier spacing of 15 kHz and the numerology µ=4 has a subcarrier spacing of 240 kHz. The symbol length/duration is inversely related to the subcarrier spacing. FIGS. 3A-3D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 microseconds (µs). Within a set of frames, there may be one or more different bandwidth parts (BWPs) (see FIG. 3B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry at least one pilot signal, such as a reference signal (RS), for the UE. Broadly, RSs may be used for beam training and management, tracking and positioning, channel estimation, and/or other such purposes. In some configurations, an RS may include at least one demodulation RS (DM-RS) (indicated as Rx for one particular configuration, where 100× is the port number, but other DM-RS configurations are possible) and/or at least one channel state information (CSI) RS (CSI-RS) for channel estimation at the UE. In some other configurations, an RS may additionally or alternatively include at least one beam measurement (or management) RS (BRS), at least one beam refinement RS (BRRS), and/or at least one phase tracking RS (PT-RS).

FIG. 3B illustrates an example of various downlink channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. A UE (such as a UE 104 of FIG. 1) may use the PSS to determine subframe/symbol timing and a physical layer identity. A secondary synchronization signal (SSS) may be within symbol 4 of particular subframes of a frame. A UE (such as a UE 104 of FIG. 1) may use the SSS to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 3D illustrates an example of various uplink channels within a subframe of a frame. The PUCCH may be located as indicated in one configuration. The PUCCH carries uplink control information (UCI), which may include a scheduling request (SR), a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 4:
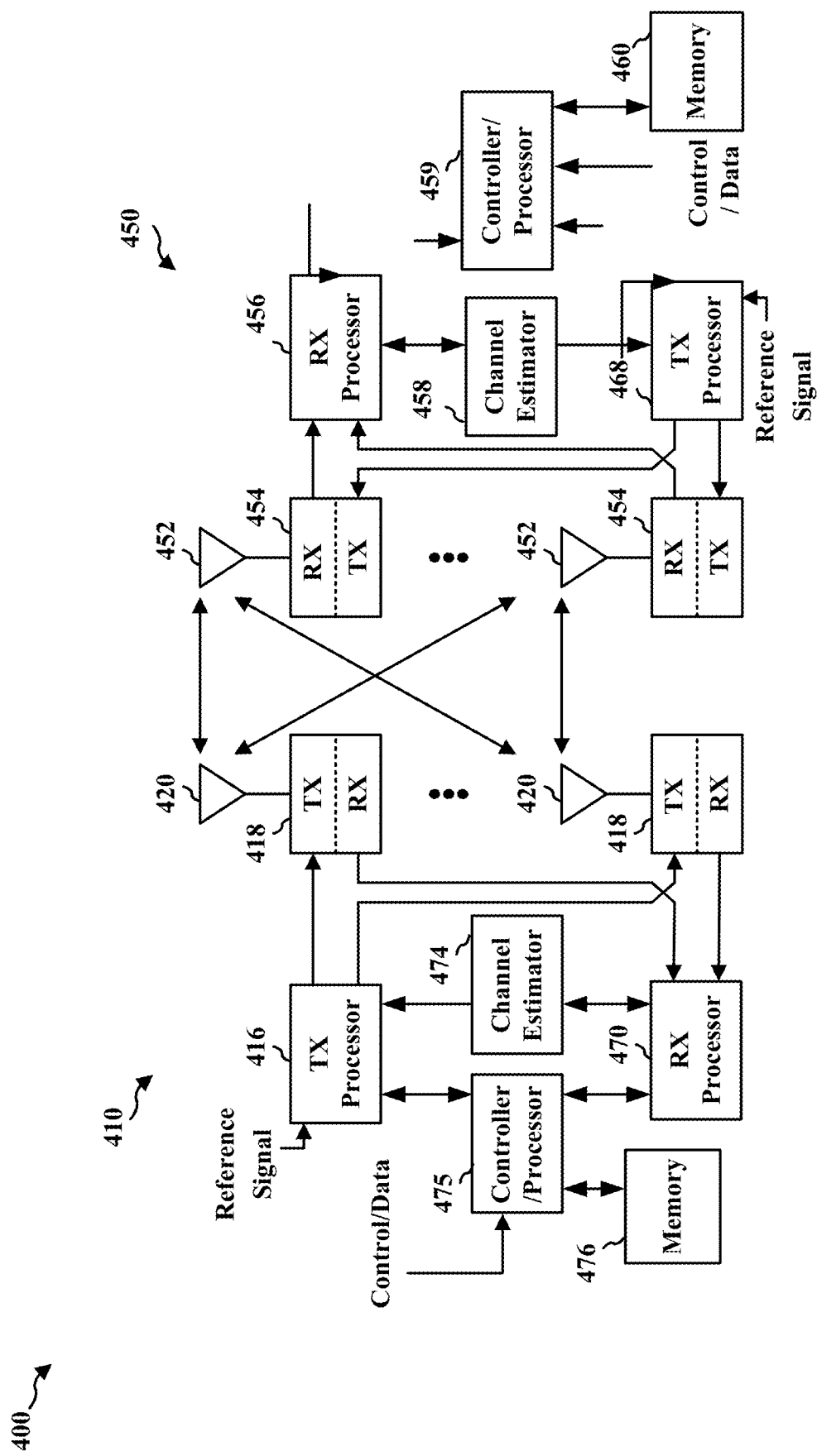
FIG. 4 is a diagram illustrating an example of a base station and user equipment (UE) in an access network.

FIG. 4 is a block diagram of a base station 410 in communication with a UE 450 in an access network 400. In the downlink, IP packets from the EPC 160 may be provided to a controller/processor 475. The controller/processor 475 implements Layer 2 (L2) and Layer 3 (L3) functionality. L3 includes an RRC layer, and L2 includes a SDAP layer, a PDCP layer, an RLC layer, and a MAC layer. The controller/processor 475 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ. priority handling, and logical channel prioritization.

The transmit (TX) processor 416 and the receive (RX) processor 470 implement Layer 1 (L1) functionality associated with various signal processing functions. L1, which includes a PHY layer, may include error detection on the transport channels, FEC coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the UE 450. Each spatial stream may then be provided to a different antenna 420 via a separate transmitter 418TX. Each transmitter 418TX may modulate an RF carrier with a respective spatial stream for transmission.

At the UE 450, each receiver 454RX receives a signal through at least one respective antenna 452. Each receiver 454RX recovers information modulated onto an RF carrier and provides the information to the receive (RX) processor 456. The TX processor 468 and the RX processor 456 implement L1 functionality associated with various signal processing functions. The RX processor 456 may perform spatial processing on the information to recover any spatial streams destined for the UE 450. If multiple spatial streams are destined for the UE 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 410. These soft decisions may be based on channel estimates computed by the channel estimator 458. The soft decisions are then decoded and deinterleaved to recover the data and control signals that were originally transmitted by the base station 410 on the physical channel. The data and control signals are then provided to the controller/processor 459, which implements L3 and L2 functionality.

The controller/processor 459 can be associated with a memory 460 that stores program codes and data. The memory 460 may be referred to as a computer-readable medium. In the uplink, the controller/processor 459 provides demultiplexing between transport and logical channels, packet reassembly, deciphering, header decompression, and control signal processing to recover IP packets from the EPC 160. The controller/processor 459 is also responsible for error detection using an ACK and/or NACK protocol to support HARQ operations.

Similar to the functionality described in connection with the downlink transmission by the base station 410, the controller/processor 459 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by the base station 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The uplink transmission is processed at the base station 410 in a manner similar to that described in connection with the receiver function at the UE 450. Each receiver 418RX receives a signal through at least one respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. In the uplink, the controller/processor 475 provides demultiplexing between transport and logical channels, packet reassembly, deciphering, header decompression, control signal processing to recover IP packets from the UE 450. IP packets from the controller/processor 475 may be provided to the EPC 160. The controller/processor 475 is also responsible for error detection using an ACK and/or NACK protocol to support HARQ operations.

In some aspects, at least one of the TX processor 468, the RX processor 456, and the controller/processor 459 may be configured to perform aspects in connection with the selection of an ML-assisted scheme or a non-ML-assisted scheme for CSI feedback from a UE (e.g., the UE 104 and/or the UE 450) to a network node (e.g., the base station 102/180 and/or the base station 410), as illustrated and described with respect to element 198 of FIG. 1.

In some other aspects, at least one of the TX processor 416, the RX processor 470, and the controller/processor 475 may be configured to perform aspects in connection with the selection of an ML-assisted scheme or a non-ML-assisted scheme for CSI feedback from a UE (e.g., the UE 104 and/or the UE 450) to a network node (e.g., the base station 102/180 and/or the base station 410), as illustrated and described with respect to element 198 of FIG. 1.

Figure 5:
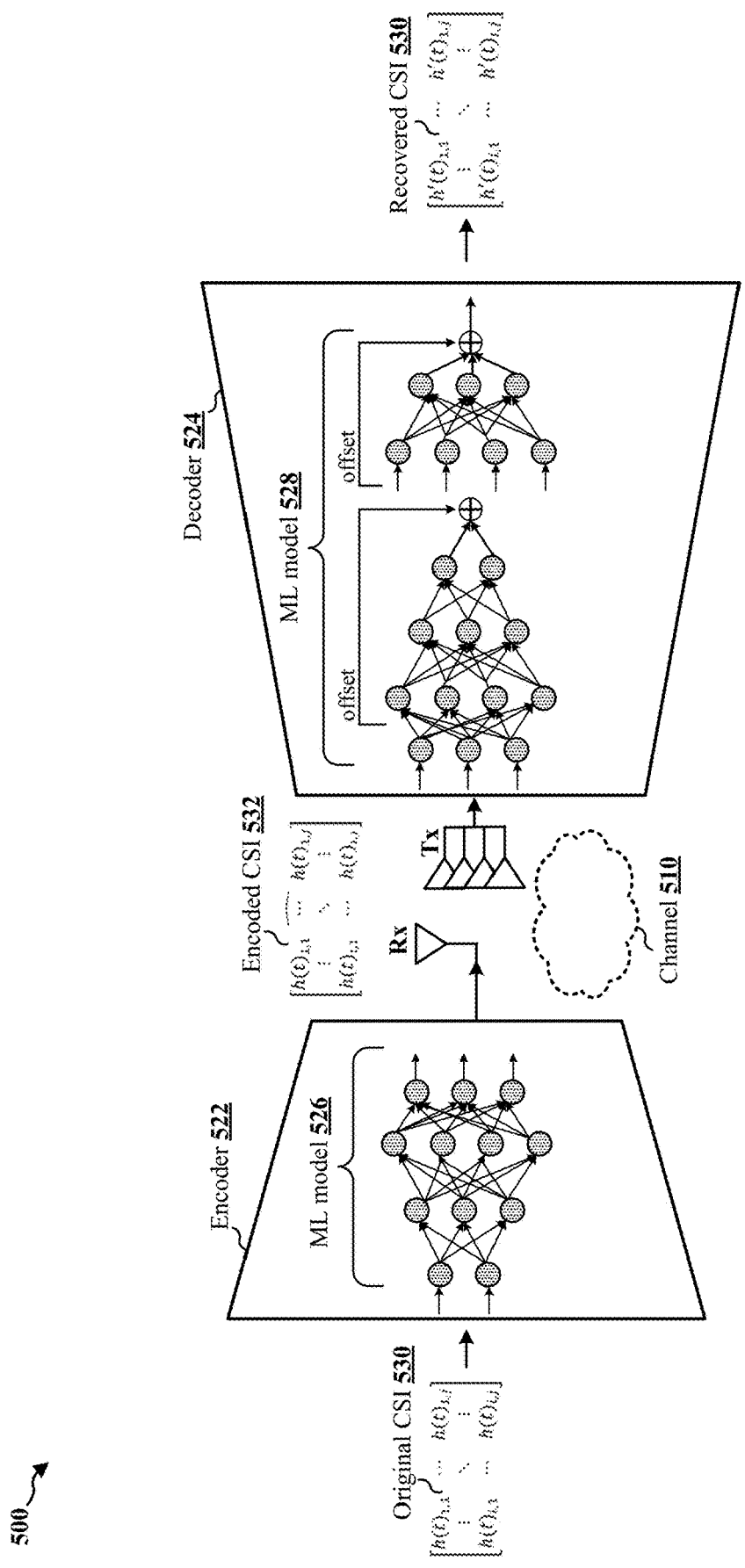
FIG. 5 is a block diagram illustrating a machine-learning (ML) assisted scheme for CSI feedback.

FIG. 5 is a block diagram 500 illustrating an ML-assisted scheme for CSI feedback. An encoder 522 may be implemented at a UE, such as the UE 104 of FIG. 1 and/or the UE 450 of FIG. 4, whereas a decoder 524 may be implemented at a network node, such as the base station 102/180 of FIG. 1 and/or the base station 410 of FIG. 4.

The encoder 522 and decoder 524 may be matched, and may include a respective one of the ML models 526, 528. When a UE calculates original CSI 530, the UE may encode the original CSI 530 using the ML model 526. Such encoding may be used to predict one or more elements of a channel matrix and/or other CSI element.

The output of the encoder 522 may include encoded CSI 532, which may be transmitted by the UE to the network node. Upon receiving the encoded CSI 532, the network node may provide the encoded CSI 532 to the decoder 524. The ML model 528 of the decoder 524 may assist in recovering the CSI from the encoded CSI 532 and, potentially, may predict or supplement one or more CSI components, e.g., based on the decoding process. The output of the decoder 524 may be reconstructed CSI 534, which the network node may use to configure communication with the UE according to the estimated channel between the UE and the network node.

Figure 6:
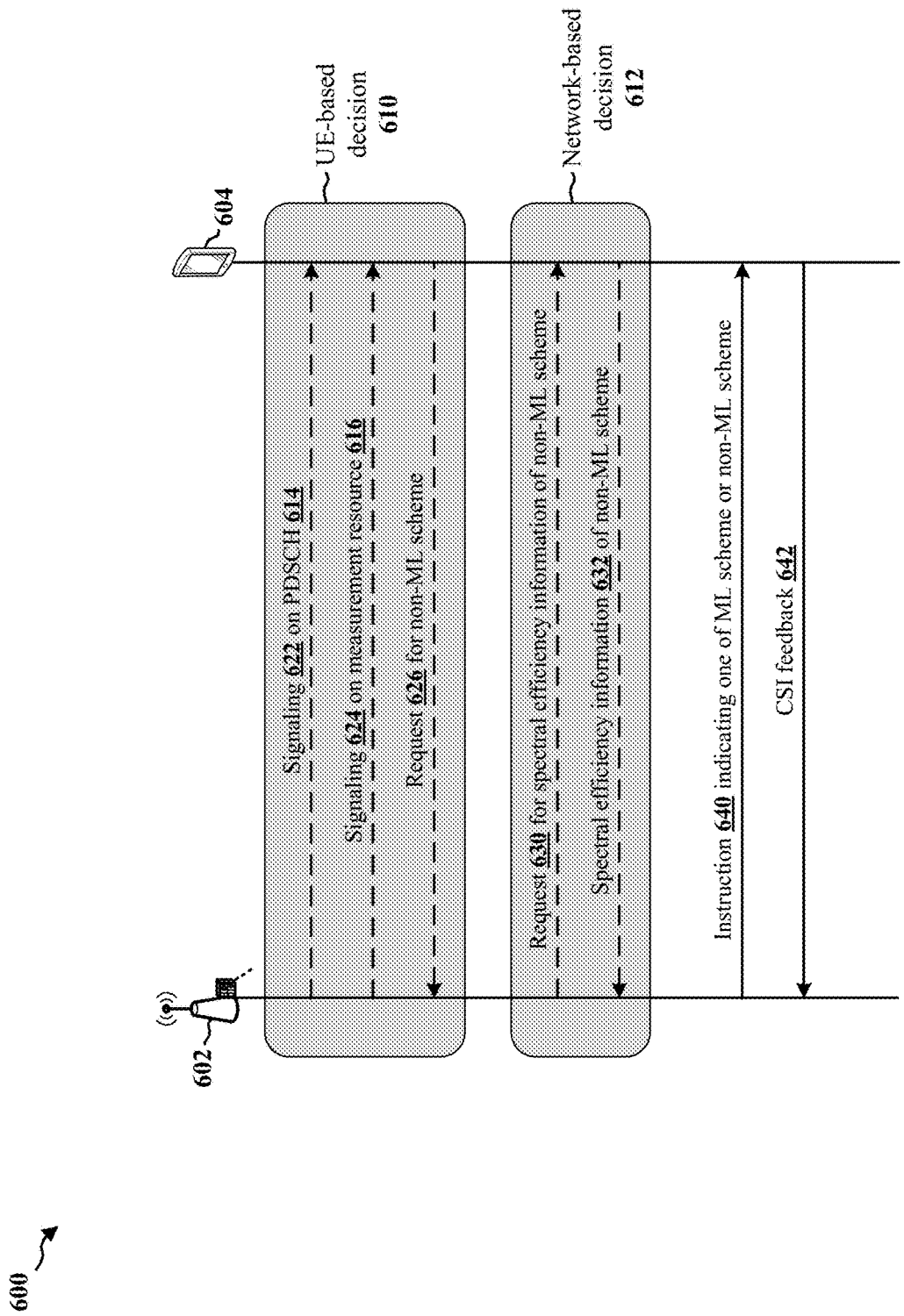
FIG. 6 is a call flow diagram illustrating selection of an ML-assisted or ML-unassisted scheme for reporting CSI feedback to a network node by a UE.

FIG. 6 is a call flow diagram 600 illustrating selection of an ML-assisted or ML-unassisted scheme for reporting CSI feedback to a network node 602 by a UE 604. The network node 602 may be an implementation of at least one of the base stations 102/180 of FIG. 1 and/or the base station 410 of FIG. 4. The UE 604 may be an implementation of at least one of the UE 104 of FIG. 1 and/or the UE 450 of FIG. 4. In some aspects, the encoder 522 and the decoder 524 shown and described with respect to FIG. 5 may be included in the UE 604 and the network node 602, respectively.

The network node 602 and the UE 604 may be configured to use one of an ML-assisted scheme or a non-ML-assisted scheme for CSI feedback. As shown and described with respect to FIG. 5, the ML-assisted scheme involves ML models implemented at the encoder and decoder of the UE 604 and the network node 602, respectively. In order for encoded CSI to be successfully recovered and provide channel estimates that are sufficiently accurate, the ML models of the encoder and decoder may match one another. The CSI may be used to transmit signaling from the network node 602 to the UE 604, such as data on a PDSCH.

Where a mismatch occurs between the encoder and the decoder, system performance may be degraded, and the spectral efficiency may suffer. In some such instances, a non-ML-assisted scheme (or legacy scheme) may enable better performance, at least until the ML models can be adjusted such that the encoder and decoder are again matched. Thus, the network node 602 and the UE 604 may select between the ML-assisted scheme and the non-ML assisted scheme for CSI feedback, depending upon which enables a better spectral efficiency. The selection between ML-assisted and non-ML-assisted schemes may be based on a UE decision or based on a network decision.

When operating on a cell provided by the network node 602, the UE 604 may receive various signaling from the network node 602 across multiple physical channels. For example, the network node 602 may transmit, to the UE 604, control information on a PDCCH and data on a PDSCH. With respect to the UE-based decision 610 for selection of a CSI feedback scheme, the UE 604 may indicate a selection of a CSI feedback scheme to the network node 602. As part of the process, the UE 604 may determine various spectral efficiencies.

In some aspects, signaling 622 transmitted by the network node 602 to the UE 604 on the PDSCH 614 may include reference signals, such as CSI-RSs and/or DM-RSs, in addition to data. The UE 604 may receive such signaling 622 and may measure one or more quantities or characteristics based thereon. For example, the UE 604 may measure one or more of a reference signal receive power (RSRP), reference signal receive quality (RSRQ), signal-to-noise ratio (SNR), signal-to-interference-plus-noise ratio (SINR), etc. In some aspects, the UE 604 may calculate, compute, derive or otherwise determine at least one of a rank (or RI), a modulation and coding scheme (MCS), a block error rate (BLER), a PMI, a CQI, a receive signal strength indicator (RSSI), and/or another value indicative of the channel quality and/or characteristics between the UE 604 and the network node 602.

In some aspects, the UE 604 may be configured obtain a first spectral efficiency (SPEF) measurement based on at least one of a rank, an MCS, or a BLER associated with the signaling 622 received from the network node 602 on the PDSCH 614. For example, the signaling 622 may include, inter alia, a set of CSI-RSs and/or a set of data signals on the PDSCH 614. Based on or associated with one or more of the rank, MCS, and/or BLER obtained using the signaling 622, the UE 604 may deduce, derive, compute, or otherwise determine a spectral efficiency with which data is received on the PDSCH 614. The UE 604 may express the spectral efficiency as a measurement in units of bits per second per hertz (bits/s/Hz), and therefore, the measurement in bits/s/Hz may convey the net data rate in bits per second (bps) divided by the bandwidth in Hz.

Signaling received by the UE 604 on the PDSCH 614 may be transmitted by the network node 602 based on or associated with CSI feedback that the UE 604 transmits to the network node 602. In some aspects, the UE 604 may calculate, compute, or otherwise determine CSI, e.g., based on the measured quantities or characteristics associated with signaling on the PDSCH 614. In some instances, the UE 604 and the network node 602 initially may employ an ML-assisted scheme for CSI feedback. Accordingly, the UE 604 may encode CSI (e.g., a channel matrix) using an encoder that includes an ML model that may estimate (e.g., predict or forecast) the channel conditions between the UE 604 and the network node 602. Therefore, the abovementioned first SPEF measurement may be indicative of a first spectral efficiency that is achieved using an ML-assisted scheme for CSI feedback.

In some aspects, the UE 604 may be further configured to obtain a second measurement based on signaling 624 received on a measurement resource 616, such as a channel measurement resource (CMR) or an (IMR). The measurement resource 616 may be a resource scheduled by the network node 602 to be dedicated to measurements by the UE 604, such as channel measurements and/or interference measurements. The UE 604 may receive signaling 624 on the measurement resource 616 and may measure one or more quantities or characteristics based thereon. For example, the UE 604 may measure one or more of a RSRP, RSRQ, SNR, SINR, etc. In some other aspects, the UE 604 may calculate, compute, derive or otherwise determine at least one of a rank (or RI), an MCS, a BLER, a PMI, a CQI, an RSSI, and/or another value indicative of the channel quality and/or characteristics between the UE 604 and the network node 602.

In some aspects, the UE 604 may calculate, compute, or otherwise determine CSI using a non-ML-assisted scheme for CSI feedback (e.g., a reference or legacy CSI feedback scheme) based on the signaling 624 received on the measurement resource 616. The non-ML-assisted scheme may be any suitable CSI feedback scheme that does not feature an encoder/decoder having an ML model. In some aspects, multiple (non-ML-assisted or legacy) CSI feedback schemes may be available for use as a reference CSI feedback scheme. In some aspects, the UE 604 may be configured to select one of the CSI feedback schemes based on at least a size of the payload configured for a CSI report encoded using the ML model or other AI-assisted mechanism. For example, the UE 604 may select the one of the CSI feedback schemes having a payload size that is approximately equal to or within a threshold amount of the payload size of CSI encoded using the ML-assisted encoder. For example, a standard promulgated by a standards body, such as 3GPP, may specify a set of reference or legacy CSI feedback schemes with different CSI feedback payload sizes, and the UE 604 may select the CSI feedback scheme having a payload size that corresponds with (e.g., is equal to or is within a range that includes) the payload size of ML-assisted CSI feedback. In some other aspects, the UE 604 may receive an RRC configuration message (or other RRC signaling message) from the network node 602 that (explicitly or implicitly) indicates which of the CSI feedback schemes should be implemented as the reference.

In some aspects, the UE 604 may be configured obtain a second SPEF measurement based on measurement(s) on the measurement resource 616. For example, the signaling 622 may include, inter alia, a set of CSI-RSs and/or a set of data signals on the PDSCH 614. Based on or associated with one or more of the rank, MCS, and/or BLER obtained using the signaling 622, the UE 604 may deduce, derive, compute, or otherwise determine a spectral efficiency with which data is received using the reference or legacy CSI feedback scheme. For example, the UE 604 may receive another set of signals on at least one of a CMR and/or an IMR. The UE 604 may measure energies, signal strengths, and/or another characteristic(s) of the other set of signals. The UE 604 may deduce, derive, compute, or otherwise determine another spectral efficiency with which the other set of signals is received on the CMR and/or IMR based on the measured energies, signal strengths, and/or other characteristic(s) of the other set of signals.

The other set of signals received by the UE 604 on the CMR and/or IMR may be transmitted by the network node 602 based on or associated with other CSI feedback provided to the network node 602 by the UE 604, although such other CSI feedback may be derived and encoded using a reference CSI feedback scheme that is unassisted by an ML or another AI-assisted mechanism. Therefore, the second measurement may be indicative of a second spectral efficiency that is achievable using a scheme for CSI feedback that is unassisted by ML and AI.

The UE 604 may be configured to compare the first SPEF measurement and the second SPEF measurement. Based on the comparison, the UE 604 may be configured to determine which of the two measurements is higher or greater, which may indicate a more efficient, less erroneous, and/or other "better" use of spectrum resources. The UE 604 may select between the ML-assisted and non-ML assisted schemes for CSI feedback according to which is associated with the higher or greater measurement (and so is associated with the better spectral efficiency). In some aspects, the UE 604 may compare the first SPEF measurement and the second SPEF measurement where the selection between ML-assisted and non-ML assisted schemes for CSI feedback is based on a decision by the UE 604.

In some aspects, the UE 604 may be configured to transmit, to the network node 602, a request to use the non-ML CSI feedback scheme for the CSI feedback when the first SPEF measurement is less than the second SPEF measurement. In some aspects, the request may be included in a MAC control element (CE). In some other aspects, the request may be included in UE assistance information (UAI).

The first SPEF measurement may be indicative of the first spectral efficiency that is achieved using an ML-assisted scheme for CSI feedback. The first SPEF measurement being less than the second SPEF measurement, for example, by an offset or threshold amount, may be indicative of an encoder-decoder mismatch with respect to the ML model currently being used for CSI feedback. Such a mismatch may cause the spectral efficiency to suffer, and potentially to the point that an ML-assisted CSI feedback scheme becomes inferior to non-ML assisted or legacy CSI feedback schemes. Thus, in order to efficiently and accurately transmit data over the channel, the network and the UE 604 may fall back to a non-ML-assisted CSI feedback scheme and/or the ML model being used to encode the CSI feedback may be retrained, retuned, and/or otherwise reconfigured to more accurately capture channel state properties that CSI is intended to indicate.

However, the second SPEF measurement being less than the first SPEF measurement may be indicative of the ML model providing a more accurate and/or more responsive prediction on the channel state. Accordingly, the UE 604 and the network node 602 may continue on with use of the ML model for encoding and decoding CSI feedback from the UE 604 to the network node 602.

In some implementations, the decision to switch CSI feedback schemes may be a network-based decision 612. According to some aspects, the UE 604 may be configured to receive, from the network node 602, a request 630 for information indicating the second spectral efficiency (that is, the spectral efficiency associated with the legacy CSI feedback scheme). For example, the request 630 may be received in a MAC CE or an RRC signaling message.

The UE 604 may be configured to obtain one or more measurements associated with the second spectral efficiency. For example, as described with respect to the UE-based decision 610, the UE 604 may be configured to obtain a measurement based on signaling 624 received on a measurement resource 616, such as a CMR or an IMR. The UE 604 may measure one or more quantities or characteristics based on signaling (e.g., signaling 624) received from the network node 602. For example, the UE 604 may measure one or more of a RSRP, RSRQ, SNR, SINR, etc. In some other aspects, the UE 604 may calculate, compute, derive or otherwise determine at least one of a rank (or RI), an MCS, a BLER, a PMI, a CQI, an RSSI, and/or another value indicative of the channel quality and/or characteristics between the UE 604 and the network node 602.

Using obtained measurement(s) associated with the non-ML-assisted CSI feedback scheme, the UE 604 may determine the spectral efficiency associated with the non-ML-assisted CSI feedback scheme. In some aspects, the UE 604 may estimate the second spectral efficiency using CSI calculated with non-ML-assisted CSI feedback scheme. The UE 604 may calculate the second spectral efficiency as a measurement in units of bits/s/Hz. Thus, the measurement in bits/s/Hz may convey the net data rate in bps divided by the bandwidth in Hz when CSI feedback is unassisted by ML or another AI mechanism.

The UE 604 may be configured to transmit, to the network node 602, information indicating the second spectral efficiency. The information 632 indicating the second spectral efficiency may include a measurement in the units of bits/s/Hz. In some aspects, the UE 604 may transmit the information 632 indicating the second spectral efficiency in response to receiving the request 630 for such information from the network node 602. For example, the UE 604 may indicate the information 632 indicating the second spectral efficiency in a MAC CE. In some other aspects, the UE 604 may transmit the information 632 indicating the second spectral efficiency to the network node 602 when a request for the information indicating the second spectral efficiency is absent; that is, the UE 604 may be configured to autonomously determine to transmit the information 632 indicating the second spectral efficiency to the network node 602. The UE 604 may do so, for example, periodically or when the spectral efficiency associated with the ML-assisted CSI feedback scheme falls below a threshold. The UE 604 may include the information 632 indicating the second spectral efficiency in UAI.

Accordingly, the network node 602 may be configured to obtain a first measurement that indicates the spectral efficiency associated with the non-ML-assisted CSI feedback scheme, as provided by the UE 604. In addition, the network node 602 may be configured to obtain a first estimation associated with the first spectral efficiency using HARQ feedback for signaling transmitted to the UE 604 on a PDSCH. For example, the network node 602 may count, over a time period, at least one of a number of ACK messages and/or a number of NACK messages received from the UE 604 in response to signaling transmitted by the network node 602 on the PDSCH. The network node 602 may estimate the number of bits transmitted on the PDSCH that are successfully received by the UE 604 in proportion to the total number of bits transmitted on the PDSCH based on the number of TBs that are acknowledged as successfully received and/or the number of TBs that are not acknowledged as successfully received. Taken over a discrete time period on a discrete bandwidth, the network node 602 may estimate the spectral efficiency associated with the ML CSI feedback scheme in terms of bits/s/Hz.

Further, the network node 602 may be configured to obtain a second estimation associated with the first spectral efficiency using at least one of output of a decoder that includes an ML model or a CQI report that is based on ML CSI feedback. For example, the network node 602 may obtain a message (e.g., a CSI report) transmitted by the UE 604, and the network node 602 may provide the message to the decoder having the ML model. The output of the decoder may include a reconstructed message (e.g., reconstructed CSI) intended to recover the original message transmitted by the UE 604. The network node 602 may determine the number of errors in the reconstructed message and/or the network node 602 may determine a number of elements of a CSI matrix are inaccurate and/or fail to adequately represent the channel H.

The network node 602 may select one of an ML CSI feedback scheme associated with the first spectral efficiency or the non-ML CSI feedback scheme associated with the second spectral efficiency. In some instances of the network-based decision 612, the network node 602 may compare the first measurement, the first estimation, and the second estimation. The network node 602 may select the non-ML CSI feedback scheme when the second spectral efficiency is greater than the first spectral efficiency, but may select the ML CSI feedback scheme when the second spectral efficiency is less than the first spectral efficiency.

In some aspects, where the first measurement is greater than both the first and second estimations (which may be similar or approximately equal), the network node 602 may determine that the ML model is causing inaccurate reconstruction of CSI reports. For example, an ML model mismatch of the encoder and decoder may be degrading network performance as represented via spectral efficiency. In such aspects, the network node 602 may select the ML-unassisted CSI feedback scheme, and therefore, CSI reporting between the UE 604 and the network node 602 may fall back to ML-unassisted CSI reporting.

In some other aspects, the first measurement may be similar or approximately equal to the second estimation, and the first measurement and the second estimation may be greater than the first estimation. In such other aspects, the network node 602 may determine that the ML model of the decoder may provide some degree of accuracy with respect to CSI used to recover messages, but channel estimation may be degraded. The network node 602 may determine to reconfigure the ML model, such as by adjusting weights, parameters, features, and/or other characteristics of the ML model. In such other aspects, the network node 602 may select the ML-assisted CSI feedback scheme or the ML-unassisted CSI feedback scheme.

In still further aspects, the network node 602 may determine that the first and second estimations may be similar or approximately equal, with both being greater than the first measurement. In such further aspects, the network node 602 may determine that the ML model improves the spectral efficiency relative to non-ML CSI feedback schemes, and therefore, the network node 602 may select the ML-assisted CSI feedback scheme.

The network node 602 may transmit, to the UE 604, an instruction 640 indicating one of an ML CSI feedback scheme associated with the first spectral efficiency or a non-ML CSI feedback scheme associated with a second spectral efficiency to be used for CSI feedback. In some aspects, the instruction 640 may be transmitted in at least one of a MAC CE and/or an RRC signaling message. In some aspects, the network node 602 may further reconfigure the ML model implemented at the encoder of the UE 604, such as by transmitting instructions to the UE 604 to add, remove, and/or adjust weights and/or other parameters of the ML model so that the channel between the UE 604 and the network node 602 can be more accurately estimated and spectrum resources may be more effectively utilized.

After receiving the instruction 640, the UE 604 may be configured to report CSI feedback 642 to the network node 602 using the indicated one of the ML CSI feedback scheme or the non-ML CSI feedback scheme. For example, when the ML CSI feedback scheme is selected, the UE 604 may be configured to encode CSI based on an ML model, such as an ML model that estimates or assists in estimating one or more qualities or characteristics of the channel between the UE 604 and the network node 602. Illustratively, one or more elements of a channel matrix may be encoded, estimated, or otherwise influenced using the ML model or another AI mechanism. The UE 604 may transmit such encoded CSI feedback 642 to the network node 602.

However, when the non-ML CSI feedback scheme is selected, the UE 604 may be configured to calculate, compute, measure, derive, or otherwise determine CSI without the assistance of the ML model or other AI-assisted mechanism. For example, the UE 604 may calculate, compute, derive, or otherwise determine CSI using signals received from the network node 602, such that the UE 604 obtains a channel matrix in which none of the elements results from the output of a neural network or other AI-assisted mechanism. In some instances, the non-ML CSI feedback scheme may be implemented as legacy (e.g., known) CSI feedback scheme. The UE 604 may transmit the CSI feedback 642 to the network node 602.

Figure 7:
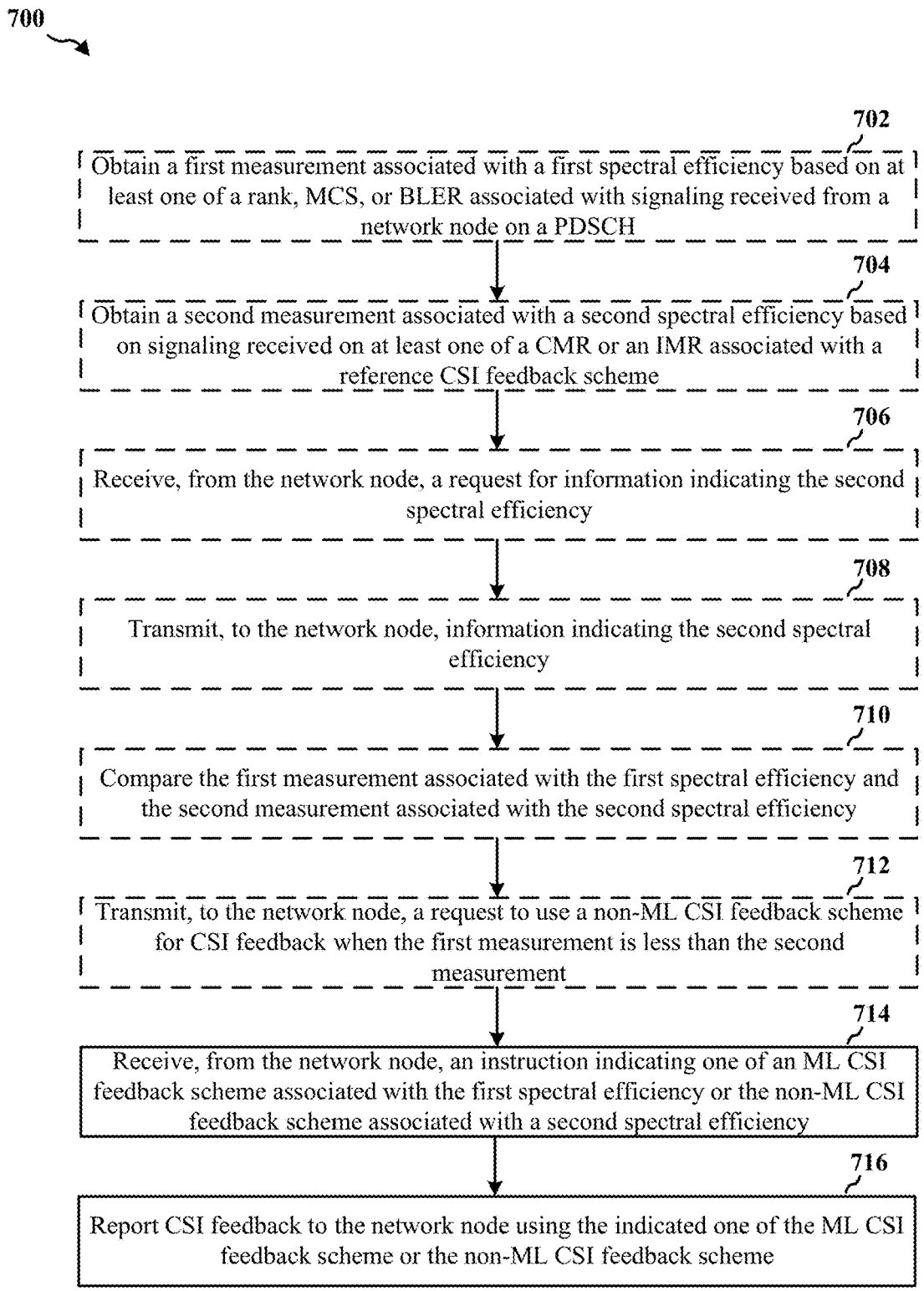
FIG. 7 is a flowchart illustrating an example of a method of wireless communication at a UE.

FIG. 7 is a flowchart 700 of a method of wireless communication. The method may be performed by or at a UE (e.g., the UE 104, 450, 604), another wireless communications apparatus (e.g., the apparatus 902), or one or more components thereof. According to various different aspects, one or more of the illustrated blocks may be omitted, transposed, and/or contemporaneously performed.

At 702, a UE may be configured obtain a first measurement based on at least one of a rank, an MCS, or a BLER associated with signaling received from a network node on a PDSCH. For example, the UE may receive a set of signals (e.g., a set of CSI-RSs and/or a set of data signals) from the network node on a set of resources configured as a PDSCH. The UE may measure energies, signal strengths, and/or another characteristic(s) of the set of signals. The UE may calculate, compute, deduce or otherwise determine one or more of a rank, an MCS, and/or a BLER associated with the set of signals using the measured energies, signal strengths, and/or another characteristic(s). Based on or associated with the one or more of the rank, MCS, and/or BLER, the UE may deduce, derive, compute, or otherwise determine the spectral efficiency with which data is received on the PDSCH.

The set of signals received by the UE on the PDSCH may be transmitted by the network node based on or associated with CSI feedback that the UE transmitted to the network node. The UE may encode such CSI feedback using an ML model or other AI-assisted mechanism included in or otherwise associated with an encoder of the UE. Therefore, the first measurement may be indicative of a first spectral efficiency that is achieved using an ML-assisted scheme for CSI feedback.

At 704, the UE may be configured to obtain a second measurement based on signaling received on at least one of a CMR or an IMR associated with a reference CSI feedback scheme. For example, the UE may receive another set of signals on at least one of a CMR and/or an IMR. The UE may measure energies, signal strengths, and/or another characteristic(s) of the other set of signals. The UE may deduce, derive, compute, or otherwise determine another spectral efficiency with which the other set of signals is received on the CMR and/or IMR based on the measured energies, signal strengths, and/or other characteristic(s) of the other set of signals.

The other set of signals received by the UE on the CMR and/or IMR may be transmitted by the network node based on or associated with other CSI feedback provided to the network node by the UE, although such other CSI feedback may be derived and encoded using a reference CSI feedback scheme that is unassisted by an ML or another AI-assisted mechanism. Therefore, the second measurement may be indicative of a second spectral efficiency that is achievable using a scheme for CSI feedback that is unassisted by ML and AI. For example, the reference CSI feedback scheme may be a legacy CSI feedback scheme.

In some aspects, multiple (non-ML-assisted or legacy) CSI feedback schemes may be available for use as a reference CSI feedback scheme. In some aspects, the UE may be configured to select one of the CSI feedback schemes based on at least a size of the payload configured for a CSI report encoded using the ML model or other AI-assisted mechanism. For example, the UE may select the one of the CSI feedback schemes having a payload size that is approximately equal to or within a threshold amount of the payload size of CSI encoded using the ML-assisted encoder. In some other aspects, the UE may receive an RRC configuration message (or other RRC signaling message) from the network node that (explicitly or implicitly) indicates which of the CSI feedback schemes should be implemented as the reference.

At 706, the UE may be configured to receive, from the network node, a request for information indicating the second spectral efficiency. In some aspects, the UE may receive the request for the information indicating the second spectral efficiency where the selection between ML-assisted and non-ML assisted schemes for CSI feedback is based on a decision by the network node.

At 708, the UE may be configured to transmit, to the network node, information indicating the second spectral efficiency. In some aspects, the UE may transmit the information indicating the second spectral efficiency in response to receiving a request for such information from the network node (as described in connection with 706). In some other aspects, the UE may transmit the information indicating the second spectral efficiency to the network node in the absence of a request for the information indicating the second spectral efficiency; that is, the UE may be configured to autonomously determine to transmit the information indicating the second spectral efficiency to the network node. For example, the UE may compare the first measurement with a threshold, and if the first measurement fails to satisfy (e.g., is less than) the threshold, the UE may autonomously determine to transmit the second measurement to the network node. In some aspects, the UE may transmit the information indicating the second spectral efficiency where the selection between ML-assisted and non-ML assisted schemes for CSI feedback is based on a decision by the network node.

At 710, the UE may be configured to compare the first measurement associated with the first spectral efficiency and the second measurement associated with the second spectral efficiency. Based on the comparison, the UE may be configured to determine which of the two measurements is higher or greater, which may indicate a more efficient, less erroneous, and/or other "better" use of spectrum resources. The UE may select between the ML-assisted and non-ML assisted schemes for CSI feedback according to which is associated with the higher or greater measurement (and so is associated with the better spectral efficiency). In some aspects, the UE may compare the first measurement associated with the first spectral efficiency and the second measurement associated with the second spectral efficiency where the selection between ML-assisted and non-ML assisted schemes for CSI feedback is based on a decision by the UE.

At 712, the UE may be configured to transmit to the network node, a request to use the non-ML CSI feedback scheme for the CSI feedback when the first measurement is less than the second measurement. In some aspects, the request may be included in a MAC CE. In some other aspects, the request may be included in UAI. In some aspects, the UE may transmit the request to use the non-ML CSI feedback scheme for the CSI feedback where the selection between ML-assisted and non-ML assisted schemes for CSI feedback is based on a decision by the UE.

The first measurement may be indicative of the first spectral efficiency that is achieved using an ML-assisted scheme for CSI feedback. The first measurement being less than the second measurement, for example, by an offset or threshold amount, may be indicative of an encoder-decoder mismatch with respect to the ML model currently being used for CSI feedback. Such a mismatch may cause the spectral efficiency to suffer, and potentially to the point that an ML-assisted CSI feedback scheme becomes inferior to non-ML assisted or legacy CSI feedback schemes. Thus, in order to efficiently and accurately transmit data over the channel, the network and the UE may fall back to a non-ML-assisted CSI feedback scheme and/or the ML model being used to encode the CSI feedback may be retrained, retuned, and/or otherwise reconfigured to more accurately capture channel state properties that CSI is intended to indicate.

However, the second measurement being less than the first measurement may be indicative of the ML model providing a more accurate and/or more responsive snapshot of the channel state. Accordingly, the UE and the network node may continue on with use of the ML model for encoding and decoding CSI feedback from the UE to the network node.

At 714, the UE may be configured to receive, from a network node, an instruction indicating one of an ML CSI feedback scheme associated with the first spectral efficiency or a non-ML CSI feedback scheme associated with a second spectral efficiency to be used for CSI feedback. In some aspects, the instruction may be received in at least one of a MAC CE and/or an RRC signaling message. In some aspects, the network node may further reconfigure the ML model implemented at the encoder of the UE, such as by transmitting instructions to the UE to add, remove, and/or adjust weights and/or other parameters of the ML model so that the channel between the UE and the network node can be more accurately estimated and spectrum resources may be more effectively utilized.

At 716, the UE may be configured to report CSI feedback to the network node using the indicated one of the ML CSI feedback scheme or the non-ML CSI feedback scheme. For example, when the ML CSI feedback scheme is selected, the UE may be configured to encode CSI based on an ML model, such as an ML model that estimates or assists in estimating one or more qualities or characteristics of the channel between the UE and the network node. Illustratively, one or more elements of a channel matrix may be encoded, estimated, or otherwise influenced using the ML model or another AI mechanism. The UE may transmit such encoded CSI to the network node.

However, when the non-ML CSI feedback scheme is selected, the UE may be configured to calculate, compute, measure, derive, or otherwise determine CSI without the assistance of the ML model or other AI-assisted mechanism. For example, the UE may calculate, compute, derive, or otherwise determine CSI using signals received from the network node, such that the UE obtains a channel matrix in which none of the elements results from the output of a neural network or other AI-assisted mechanism. In some instances, the non-ML CSI feedback scheme may be implemented as legacy (e.g., known) CSI feedback scheme. The UE may transmit the CSI to the network node.

Figure 8:
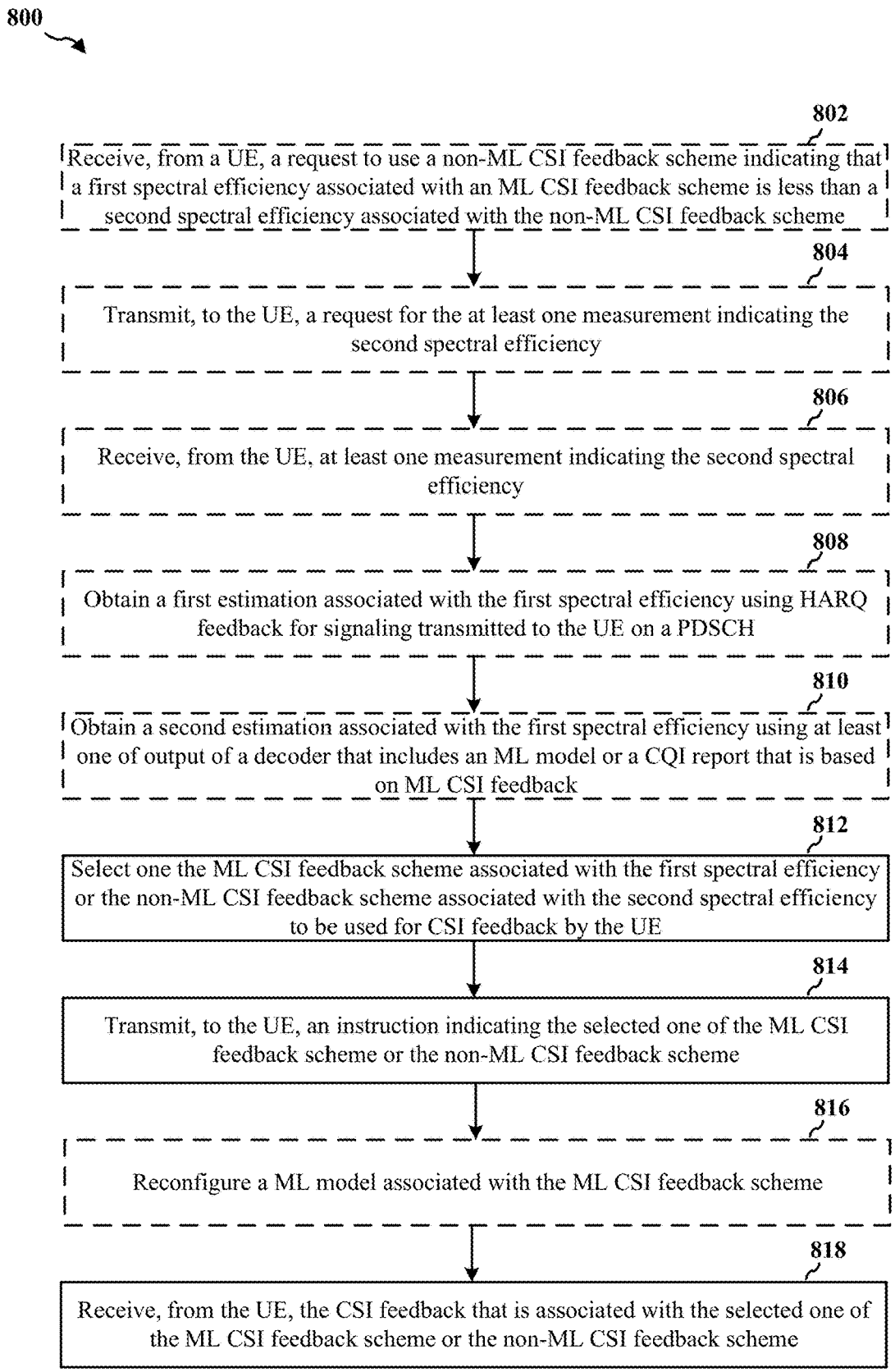
FIG. 8 is a flowchart illustrating an example of a method of wireless communication at a network node.

FIG. 8 is a flowchart 800 of a method of wireless communication. The method may be performed by or at a base station (e.g., the base station 102/180, 410), network node (e.g., the network node 602), another wireless communications apparatus (e.g., the apparatus 1002), or one or more components thereof. According to various different aspects, one or more of the illustrated blocks may be omitted, transposed, and/or contemporaneously performed.

At 802, the base station may be configured to receive, from a UE, a request to use a non-ML CSI feedback scheme instead of an ML CSI feedback scheme for CSI feedback. In some aspects, the request may indicate that a first spectral efficiency associated with the ML CSI feedback scheme is less than a second spectral efficiency associated with the non-ML CSI feedback scheme. In some aspects, the request is included in one of a MAC CE or UAI. In some aspects, the request is associated with a reference CSI feedback scheme that is based on at least one of a payload size associated with the ML CSI feedback scheme or an RRC configuration message transmitted to the UE. In some aspects, the base station may receive the request for the information indicating the second spectral efficiency where selection between ML-assisted and non-ML assisted schemes for CSI feedback is based on a decision by the UE.

At 804, the base station may be configured to transmit, to the UE, a request for at least one measurement indicating the second spectral efficiency associated with the non-ML CSI feedback scheme. In some aspects, the base station may transmit the request for the at least one measurement indicating the second spectral efficiency where selection between ML-assisted and non-ML assisted schemes for CSI feedback is based on a decision by the base station.

At 806, the base station may be configured to receive, from the UE, the at least one measurement indicating the second spectral efficiency. The at least one measurement indicating the second spectral efficiency may be included in a message that is associated with at least one of a periodicity or UAI. In some aspects, the base station may receive the at least one measurement indicating the second spectral efficiency where selection between ML-assisted and non-ML assisted schemes for CSI feedback is based on a decision by the base station.

At 808, the base station may be configured to obtain a first estimation associated with the first spectral efficiency using HARQ feedback for signaling transmitted to the UE on a PDSCH. For example, the base station may count, over a time period, at least one of a number of ACK messages and/or a number of NACK messages received from the UE in response to signaling transmitted by the base station on the PDSCH. The base station may estimate the number of bits transmitted on the PDSCH that are successfully received by the UE in proportion to the total number of bits transmitted on the PDSCH based on the number of TBs that are acknowledged as successfully received and/or the number of TBs that are not acknowledged as successfully received. Taken over a discrete time period on a discrete bandwidth, the base station may estimate the spectral efficiency associated with the ML CSI feedback scheme in terms of bits/s/Hz. In some aspects, the base station may obtain the first estimation associated with the first spectral efficiency where selection between ML-assisted and non-ML assisted schemes for CSI feedback is based on a decision by the base station.

At 810, the base station may be configured to obtain a second estimation associated with the first spectral efficiency using at least one of output of a decoder that includes an ML model or a CQI report that is based on ML CSI feedback. For example, the base station may obtain a message transmitted by the UE, and the base station may provide the message to the decoder having the ML model. The output of the decoder may include a reconstructed message intended to recover the original message transmitted by the UE. The base station may determine the number of errors in the reconstructed message and/or the base station may determine that a number of elements of a CSI matrix are inaccurate and/or fail to adequately represent the channel H. In some aspects, the base station may obtain the second estimation associated with the first spectral efficiency where selection between ML-assisted and non-ML assisted schemes for CSI feedback is based on a decision by the base station.

At 812, the base station may select one of an ML CSI feedback scheme associated with the first spectral efficiency or a non-ML CSI feedback scheme associated with the second spectral efficiency. For example, the base station may compare the first measurement, the first estimation, and the second estimation. The base station may select the non-ML CSI feedback scheme when the second spectral efficiency is greater than the first spectral efficiency, but may select the ML CSI feedback scheme when the second spectral efficiency is less than the first spectral efficiency.

In some aspects, where the first measurement is greater than both the first and second estimations (which may be similar or approximately equal), the base station may determine that the ML model is causing inaccurate reconstruction of CSI reports. For example, an ML model mismatch of the encoder and decoder may be degrading network performance as represented via spectral efficiency. Potentially, CSI reporting between the UE and the base station may fall back to ML-unassisted CSI reporting.

In some other aspects, the first measurement may be similar or approximately equal to the second estimation, and the first measurement and the second estimation may be greater than the first estimation. In such other aspects, the base station may determine that the ML model of the decoder may provide some degree of accuracy with respect to CSI used to recover messages, but channel estimation may be degraded. The base station may determine to reconfigure the ML model, such as by adjusting weights, parameters, features, and/or other characteristics of the ML model.

In still further aspects, the base station may determine that the first and second estimations may be similar or approximately equal, with both being greater than the first measurement. In such further aspects, the base station may determine that the ML model improves the spectral efficiency relative to non-ML CSI feedback schemes.

At 814, the base station may be configured to transmit, to the UE, an instruction indicating the selected one of the ML CSI feedback scheme or the non-ML CSI feedback scheme. In some aspects, the instruction may be transmitted in at least one of a MAC CE and/or an RRC signaling message.

At 816, the base station may be configured to reconfigure an ML model associated with the ML CSI feedback scheme. For example, the base station may calculate, compute, or otherwise determine one or more weights, biases, and/or other parameters of the ML model so that the channel between the UE and the network node can be more accurately estimated and spectrum resources may be more effectively utilized. In some aspects, the base station may identify one or more nodes associated with the ML model that contributed to inaccuracies in CSI reporting. The base station may adjust weights and/or biases of the one or more identified nodes.

At 818, the base station may be configured to receive, from the UE, CSI feedback that is associated with the selected one of the ML CSI feedback scheme or the non-ML CSI feedback scheme. For example, when the ML CSI feedback scheme is selected, the base station may decode CSI based on an ML model, such as an ML model that decodes or estimates qualities or characteristics of a channel matrix that represents the channel between the UE and the network node. Illustratively, one or more elements of a channel matrix may be decoded, estimated, or otherwise influenced using the ML model or another AI mechanism.

However, when the non-ML CSI feedback scheme is selected, the base station may rely on CSI feedback from the UE without the assistance of the ML model or other AI-assisted mechanism. For example, the base station may be configured to reconstruct a channel matrix in which none of the elements results from the output of a neural network or other AI-assisted mechanism. In some instances, the non-ML CSI feedback scheme may be implemented as legacy (e.g., known) CSI feedback scheme.

Figure 9:
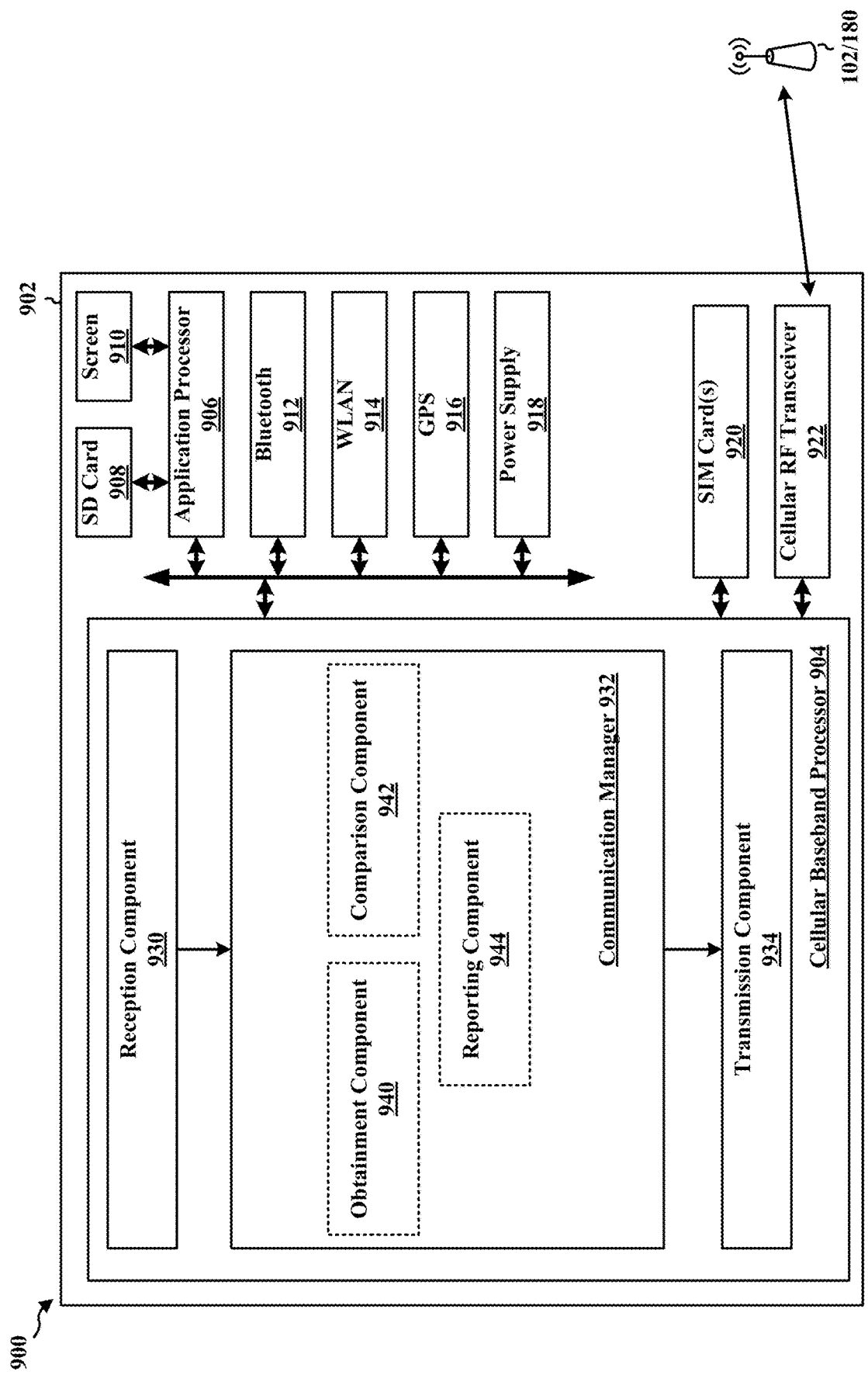
FIG. 9 is a diagram illustrating an example of a hardware implementation for an example apparatus.

FIG. 9 is a diagram 900 illustrating an example of a hardware implementation for an apparatus 902. The apparatus 902 may be a UE or similar device, or the apparatus 902 may be a component of a UE or similar device. The apparatus 902 may include a cellular baseband processor 904 (also referred to as a modem) and/or a cellular RF transceiver 922, which may be coupled together and/or integrated into the same package, component, circuit, chip, and/or other circuitry.

In some aspects, the apparatus 902 may accept or may include one or more subscriber identity modules (SIM) cards 920, which may include one or more integrated circuits, chips, or similar circuitry, and which may be removable or embedded. The one or more SIM cards 920 may carry identification and/or authentication information, such as an international mobile subscriber identity (IMSI) and/or IMSI-related key(s). Further, the apparatus 902 may include one or more of an application processor 906 coupled to a secure digital (SD) card 908 and a screen 910, a Bluetooth module 912, a wireless local area network (WLAN) module 914, a Global Positioning System (GPS) module 916, and/or a power supply 918.

The cellular baseband processor 904 communicates through the cellular RF transceiver 922 with the UE 104 and/or base station 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904.

In the context of FIG. 4, the cellular baseband processor 904 may be a component of the UE 450 and may include the memory 460 and/or at least one of the TX processor 468, the RX processor 456, and/or the controller/processor 459. In one configuration, the apparatus 902 may be a modem chip and/or may be implemented as the baseband processor 904, while in another configuration, the apparatus 902 may be the entire UE (e.g., the UE 450 of FIG. 4) and may include some or all of the abovementioned components, circuits, chips, and/or other circuitry illustrated in the context of the apparatus 902. In one configuration, the cellular RF transceiver 922 may be implemented as at least one of the transmitter 454TX and/or the receiver 454RX.

The reception component 930 may be configured to receive signaling on a wireless channel, such as signaling from a base station 102/180 or UE 104. The transmission component 934 may be configured to transmit signaling on a wireless channel, such as signaling to a base station 102/180 or UE 104. The communication manager 932 may coordinate or manage some or all wireless communications by the apparatus 902, including across the reception component 930 and the transmission component 934.

The reception component 930 may provide some or all data and/or control information included in received signaling to the communication manager 932, and the communication manager 932 may generate and provide some or all of the data and/or control information to be included in transmitted signaling to the transmission component 934. The communication manager 932 may include the various illustrated components, including one or more components configured to process received data and/or control information, and/or one or more components configured to generate data and/or control information for transmission.

The communication manager 932 may include an obtainment component 940 that may be configured obtain a first measurement based on at least one of a rank, an MCS, or a BLER associated with signaling received from a base station 102/180 on a PDSCH, e.g., as described in connection with 702 of FIG. 7. For example, the reception component 930 may receive a set of signals (e.g., a set of CSI-RSs and/or a set of data signals) from the base station 102/180 on a set of resources configured as a PDSCH. The obtainment component 940 may measure energies, signal strengths, and/or another characteristic(s) of the set of signals. The obtainment component 940 may calculate, compute, deduce or otherwise determine one or more of a rank, an MCS, and/or a BLER associated with the set of signals using the measured energies, signal strengths, and/or another characteristic(s). Based on or associated with the one or more of the rank, MCS, and/or BLER, the obtainment component 940 may calculate, estimate, derive, compute, or otherwise determine the spectral efficiency with which data is received on the PDSCH.

The set of signals received by the reception component 930 on the PDSCH may be transmitted by the base station 102/180 based on or associated with CSI feedback that the transmission component 934 transmitted to the base station 102/180. A reporting component 944, described infra, may encode such CSI feedback using an ML model or other AI-assisted mechanism included in or otherwise associated with an encoder of the apparatus 902. Therefore, the first measurement may be indicative of a first spectral efficiency that is achieved using an ML-assisted scheme for CSI feedback.

The obtainment component 940 may be further configured to obtain a second measurement based on signaling received on at least one of a CMR or an IMR associated with a reference CSI feedback scheme, e.g., as described in connection with 704 of FIG. 7. For example, the reception component 930 may receive another set of signals on at least one of a CMR and/or an IMR. The obtainment component 940 may measure energies, signal strengths, and/or another characteristic(s) of the other set of signals. The obtainment component 940 may calculate, estimate, derive, compute, or otherwise determine another spectral efficiency with which the other set of signals is received on the CMR and/or IMR based on the measured energies, signal strengths, and/or other characteristic(s) of the other set of signals.

The other set of signals received by the reception component 930 on the CMR and/or IMR may be transmitted by the base station 102/180 based on or associated with other CSI feedback provided to the base station 102/180 by the apparatus 902, although such other CSI feedback may be derived and encoded using a reference CSI feedback scheme that is unassisted by an ML or another AI-assisted mechanism. Therefore, the second measurement may be indicative of a second spectral efficiency that is achievable using a scheme for CSI feedback that is unassisted by ML and AI. For example, the reference CSI feedback scheme may be a legacy CSI feedback scheme.

In some aspects, multiple (non-ML-assisted or legacy) CSI feedback schemes may be available for use as a reference CSI feedback scheme. In some aspects, the reporting component 944 (infra) may be configured to select one of the CSI feedback schemes based on at least a size of the payload configured for a CSI report encoded using the ML model or other AI-assisted mechanism. For example, the comparison component 942 (infra) may select the one of the CSI feedback schemes having a payload size that is approximately equal to or within a threshold amount of the payload size of CSI encoded using the ML-assisted encoder. In some other aspects, the reception component 930 may receive an RRC configuration message (or other RRC signaling message) from the base station 102/180 that (explicitly or implicitly) indicates which of the CSI feedback schemes should be implemented as the reference.

The reception component 930 may be configured to receive, from the base station 102/180, a request for information indicating the second spectral efficiency, e.g., as described in connection with 706 of FIG. 7. In some aspects, the reception component 930 may receive the request for the information indicating the second spectral efficiency where the selection between ML-assisted and non-ML assisted schemes for CSI feedback is based on a decision by the base station 102/180.

The transmission component 934 may be configured to transmit, to the base station 102/180, information indicating the second spectral efficiency, e.g., as described in connection with 708 of FIG. 7. In some aspects, the transmission component 934 may transmit the information indicating the second spectral efficiency in response to receiving a request for such information from the base station 102/180 (as described in connection with 706). In some other aspects, the transmission component 934 may transmit the information indicating the second spectral efficiency to the base station 102/180 in the absence of a request for the information indicating the second spectral efficiency; that is, the apparatus 902 may be configured to autonomously determine to transmit the information indicating the second spectral efficiency to the base station 102/180. For example, a comparison component 942, described infra, may compare the first measurement with a threshold, and if the first measurement fails to satisfy (e.g., is less than) the threshold, the apparatus 902 (e.g., the reporting component 944, infra) may autonomously determine to transmit the second measurement to the base station 102/180. In some aspects, the transmission component 934 may transmit the information indicating the second spectral efficiency where the selection between ML-assisted and non-ML assisted schemes for CSI feedback is based on a decision by the base station 102/180.

The communication manager 932 may further include a comparison component 942 that may be configured to compare the first measurement associated with the first spectral efficiency and the second measurement associated with the second spectral efficiency, e.g., as described in connection with 710 of FIG. 7. Based on the comparison, the comparison component 942 may be configured to determine which of the two measurements is higher or greater, which may indicate a more efficient, less erroneous, and/or other "better" use of spectrum resources. The comparison component 942 may select between the ML-assisted and non-ML assisted schemes for CSI feedback according to which is associated with the higher or greater measurement (and so is associated with the better spectral efficiency). In some aspects, the comparison component 942 may compare the first measurement associated with the first spectral efficiency and the second measurement associated with the second spectral efficiency where the selection between ML-assisted and non-ML assisted schemes for CSI feedback is based on a decision by the apparatus 902.

The transmission component 934 may be further configured to transmit to the base station 102/180, a request to use the non-ML CSI feedback scheme for the CSI feedback when the first measurement is less than the second measurement, e.g., as described in connection with 712 of FIG. 7. In some aspects, the request may be included in a MAC CE. In some other aspects, the request may be included in UAI. In some aspects, the transmission component 934 may transmit the request to use the non-ML CSI feedback scheme for the CSI feedback where the selection between ML-assisted and non-ML assisted schemes for CSI feedback is based on a decision by the apparatus 902.

The first measurement may be indicative of the first spectral efficiency that is achieved using an ML-assisted scheme for CSI feedback. The first measurement being less than the second measurement, for example, by an offset or threshold amount, may be indicative of an encoder-decoder mismatch with respect to the ML model currently being used for CSI feedback. Such a mismatch may cause the spectral efficiency to suffer, and potentially to the point that an ML-assisted CSI feedback scheme becomes inferior to non-ML assisted or legacy CSI feedback schemes. Thus, in order to efficiently and accurately transmit data over the channel, the base station 102/180 and the apparatus 902 may fall back to a non-ML-assisted CSI feedback scheme and/or the ML model being used to encode the CSI feedback may be retrained, retuned, and/or otherwise reconfigured to more accurately capture channel state properties that CSI is intended to indicate.

However, the second measurement being less than the first measurement may be indicative of the ML model providing a more accurate and/or more responsive snapshot of the channel state. Accordingly, the apparatus 902 and the base station 102/180 may continue on with use of the ML model for encoding and decoding CSI feedback from the apparatus 902 to the base station 102/180.

The reception component 930 may be further configured to receive, from the base station 102/180, an instruction indicating one of an ML CSI feedback scheme associated with the first spectral efficiency or a non-ML CSI feedback scheme associated with a second spectral efficiency to be used for CSI feedback, e.g., as described in connection with 714 of FIG. 7. In some aspects, the instruction may be received in at least one of a MAC CE and/or an RRC signaling message. In some aspects, the base station 102/180 may further reconfigure the ML model implemented at the encoder of the apparatus 902, such as by transmitting instructions to the apparatus 902 to add, remove, and/or adjust weights and/or other parameters of the ML model so that the channel between the apparatus 902 and the base station 102/180 can be more accurately estimated and spectrum resources may be more effectively utilized.

The communication manager 932 may further include a reporting component 944 that may be configured to report CSI feedback to the base station 102/180 using the indicated one of the ML CSI feedback scheme or the non-ML CSI feedback scheme, e.g., as described in connection with 716 of FIG. 7. For example, when the ML CSI feedback scheme is selected, the reporting component 944 may be configured to encode CSI based on an ML model, such as an ML model that estimates or assists in estimating one or more qualities or characteristics of the channel between the apparatus 902 and the base station 102/180. Illustratively, one or more elements of a channel matrix may be encoded, estimated, or otherwise influenced using the ML model or another AI mechanism. The reporting component 944 may cause the transmission component 934 to transmit such encoded CSI to the base station 102/180.

However, when the non-ML CSI feedback scheme is selected, the reporting component 944 may be configured to calculate, compute, measure, derive, or otherwise determine CSI without the assistance of the ML model or other AI-assisted mechanism. For example, the reporting component 944 may calculate, compute, derive, or otherwise determine CSI using signals received from the base station 102/180, such that the reporting component 944 obtains a channel matrix in which none of the elements results from the output of a neural network or other AI-assisted mechanism. In some instances, the non-ML CSI feedback scheme may be implemented as legacy (e.g., known) CSI feedback scheme. The reporting component 944 may cause the transmission component 934 to transmit the CSI to the base station 102/180.

The apparatus 902 may include additional components that perform some or all of the blocks, operations, signaling, etc. of the algorithm(s) in the aforementioned call flow diagram and/or flowchart of FIGS. 6 and 7, respectively. As such, some or all of the blocks, operations, signaling, etc. in the aforementioned call flow diagram and/or flowchart of FIGS. 6 and 7, respectively may be performed by one or more components and the apparatus 902 may include one or more such components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for receiving, from a network node, an instruction indicating one of an ML CSI feedback scheme associated with a first spectral efficiency or a non-ML CSI feedback scheme associated with a second spectral efficiency to be used for CSI feedback; and means for reporting the CSI feedback to the network node using the indicated one of the ML CSI feedback scheme or the non-ML CSI feedback scheme.

In one configuration, the apparatus 902, and in particular the cellular baseband processor 904, may further include means for comparing a first measurement associated with the first spectral efficiency and a second measurement associated with the second spectral efficiency, and the instruction indicating the one of the ML CSI feedback scheme or the non-ML CSI feedback scheme is based on the comparing the first measurement and the second measurement.

In one configuration, the apparatus 902, and in particular the cellular baseband processor 904, may further include means for obtaining the first measurement based on at least one of a rank, MCS, or BLER associated with signaling received from the network node on a PDSCH; and means for obtaining the second measurement based on signaling received on at least one of a CMR or an IMR associated with a reference CSI feedback scheme.

In one configuration, the reference CSI feedback scheme is based on at least one of a payload size associated with the ML CSI feedback scheme or an RRC configuration message received from the network node.

In one configuration, the apparatus 902, and in particular the cellular baseband processor 904, may further include means for transmitting, to the network node, a request to use the non-ML CSI feedback scheme for the CSI feedback when the first measurement is less than the second measurement, and the instruction is received in response to the request.

In one configuration, the request is included in one of a MAC CE or UAI. In one configuration, the apparatus 902, and in particular the cellular baseband processor 904, may further include means for transmitting, to the network node, information indicating the second spectral efficiency, and the instruction is associated with the information indicating the second spectral efficiency.

In one configuration, the apparatus 902, and in particular the cellular baseband processor 904, may further include means for receiving, from the network node, a request for the information indicating the second spectral efficiency, and the information indicating the second spectral efficiency is transmitted in response to the request.

In one configuration, the information indicating the second spectral efficiency is transmitted to the network node when a request for the information indicating the second spectral efficiency is absent.

In one configuration, the instruction is included in one of a MAC CE or an RRC signaling message.

The aforementioned means may be one or more of the aforementioned components of the apparatus 902 configured to perform the functions recited by the aforementioned means. As described supra, the apparatus 902 may include the TX Processor 468, the RX Processor 456, and the controller/processor 459. As such, in one configuration, the aforementioned means may be the TX Processor 468, the RX Processor 456, and the controller/processor 459 configured to perform the functions recited by the aforementioned means.

Figure 10:
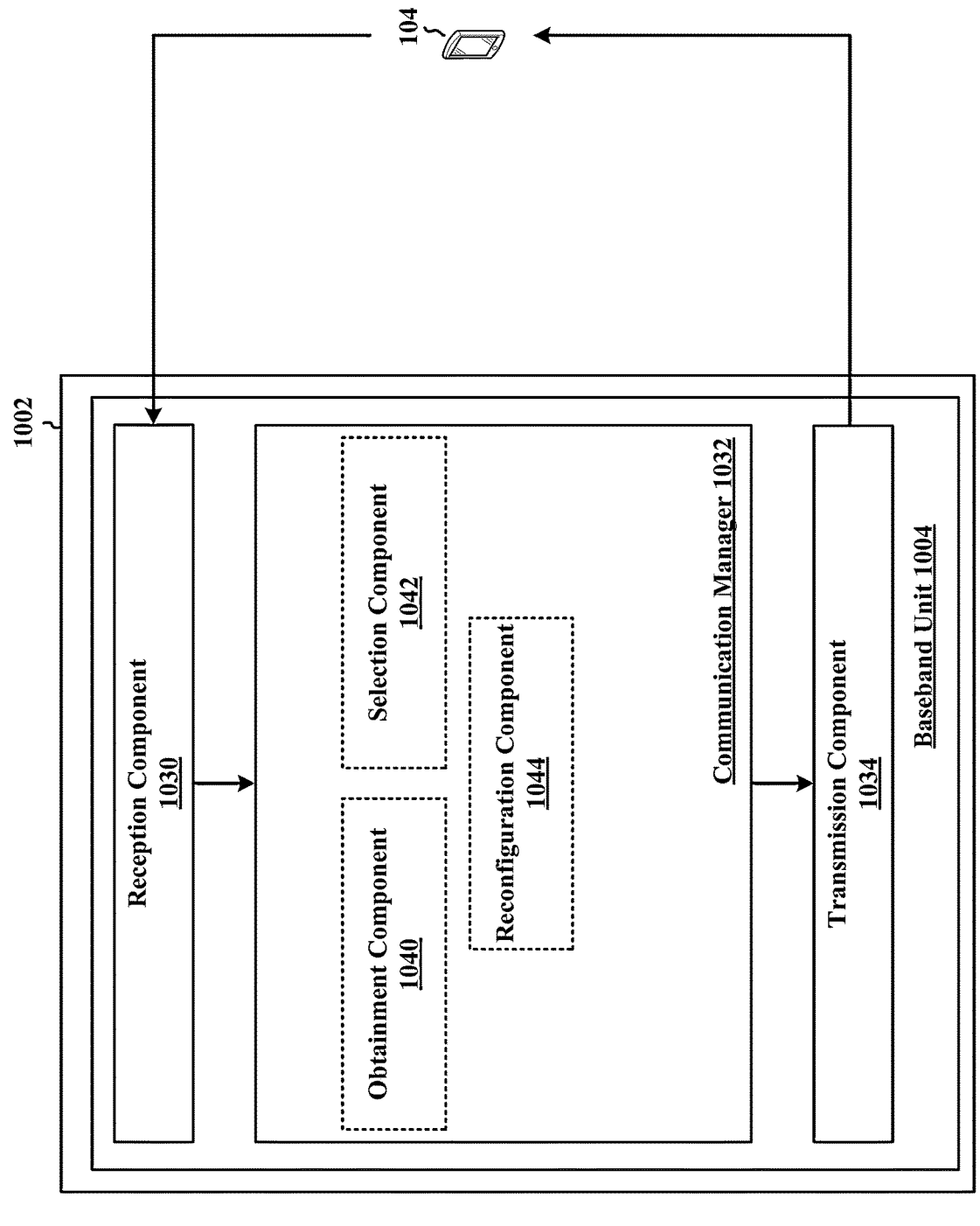
FIG. 10 is a diagram illustrating another example of a hardware implementation for another example apparatus.

FIG. 10 is a diagram 1000 illustrating an example of a hardware implementation for an apparatus 1002. The apparatus 1002 may be a base station or similar device or system, or the apparatus 1002 may be a component of a base station or similar device or system. The apparatus 1002 may include a baseband unit 1004. The baseband unit 1004 may communicate through a cellular RF transceiver. For example, the baseband unit 1004 may communicate through a cellular RF transceiver with a UE 104, such as for downlink and/or uplink communication, and/or with a base station 102/180, such as for IAB.

The baseband unit 1004 may include a computer-readable medium/memory, which may be non-transitory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the base station 410 and may include the memory 476 and/or at least one of the TX processor 416, the RX processor 470, and the controller/processor 475.

The reception component 1030 may be configured to receive signaling on a wireless channel, such as signaling from a UE 104 or base station 102/180. The transmission component 1034 may be configured to transmit signaling on a wireless channel, such as signaling to a UE 104 or base station 102/180. The communication manager 1032 may coordinate or manage some or all wireless communications by the apparatus 1002, including across the reception component 1030 and the transmission component 1034.

The reception component 1030 may provide some or all data and/or control information included in received signaling to the communication manager 1032, and the communication manager 1032 may generate and provide some or all of the data and/or control information to be included in transmitted signaling to the transmission component 1034. The communication manager 1032 may include the various illustrated components, including one or more components configured to process received data and/or control information, and/or one or more components configured to generate data and/or control information for transmission. In some aspects, the generation of data and/or control information may include packetizing or otherwise reformatting data and/or control information received from a core network, such as the core network 190 or the EPC 160, for transmission.

The reception component 1030 may be configured to receive, from a UE 104, a request to use a non-ML CSI feedback scheme instead of an ML CSI feedback scheme for CSI feedback, e.g., as described in connection with 802 of FIG. 8. In some aspects, the request may indicate that a first spectral efficiency associated with the ML CSI feedback scheme is less than a second spectral efficiency associated with the non-ML CSI feedback scheme. In some aspects, the request is included in one of a MAC CE or UAI. In some aspects, the request is associated with a reference CSI feedback scheme that is based on at least one of a payload size associated with the ML CSI feedback scheme or an RRC configuration message transmitted to the UE 104. In some aspects, the reception component 1030 may receive the request for the information indicating the second spectral efficiency where selection between ML-assisted and non-ML assisted schemes for CSI feedback is based on a decision by the UE 104.

The transmission component 1034 may be configured to transmit, to the UE 104, a request for at least one measurement indicating the second spectral efficiency associated with the non-ML CSI feedback scheme, e.g., as described in connection with 804 of FIG. 8. In some aspects, the transmission component 1034 may transmit the request for the at least one measurement indicating the second spectral efficiency where selection between ML-assisted and non-ML assisted schemes for CSI feedback is based on a decision by the apparatus 1002.

The reception component 1030 may be configured to receive, from the UE 104, the at least one measurement indicating the second spectral efficiency, e.g., as described in connection with 806 of FIG. 8. The at least one measurement indicating the second spectral efficiency may be included in a message that is associated with at least one of a periodicity or UAI. In some aspects, the reception component 1030 may receive the at least one measurement indicating the second spectral efficiency where selection between ML-assisted and non-ML assisted schemes for CSI feedback is based on a decision by the apparatus 1002.

The communication manager 1032 includes an obtainment component 1040 that may be configured to obtain a first estimation associated with the first spectral efficiency using HARQ feedback for signaling transmitted to the UE 104 on a PDSCH, e.g., as described in connection with 808 of FIG. 8. For example, the obtainment component 1040 may count, over a time period, at least one of a number of ACK messages and/or a number of NACK messages received from the UE 104 in response to signaling transmitted by the apparatus 802 on the PDSCH. The obtainment component 1040 may estimate the number of bits transmitted on the PDSCH that are successfully received by the UE 104 in proportion to the total number of bits transmitted on the PDSCH based on the number of TBs that are acknowledged as successfully received and/or the number of TBs that are not acknowledged as successfully received. Taken over a discrete time period on a discrete bandwidth, the obtainment component 1040 may estimate the spectral efficiency associated with the ML CSI feedback scheme in terms of bits/s/Hz. In some aspects, the obtainment component 1040 may obtain the first estimation associated with the first spectral efficiency where selection between ML-assisted and non-ML assisted schemes for CSI feedback is based on a decision by the apparatus 1002.

The obtainment component 1040 may be further configured to obtain a second estimation associated with the first spectral efficiency using at least one of output of a decoder that includes an ML model or a CQI report that is based on ML CSI feedback, e.g., as described in connection with 810 of FIG. 8. For example, the obtainment component 1040 may obtain a message transmitted by the UE 104, and the obtainment component 1040 may provide the message to the decoder having the ML model. The output of the decoder may include a reconstructed message intended to recover the original message transmitted by the UE 104. The obtainment component 1040 may determine the number of errors in the reconstructed message and/or the obtainment component 1040 may determine that a number of elements of a CSI matrix are inaccurate and/or fail to adequately represent the channel H. In some aspects, the obtainment component 1040 may obtain the second estimation associated with the first spectral efficiency where selection between ML-assisted and non-ML assisted schemes for CSI feedback is based on a decision by the apparatus 1002.

The communication manager 1032 may further include a selection component 1042 that may be configured to select one of an ML CSI feedback scheme associated with the first spectral efficiency or a non-ML CSI feedback scheme associated with the second spectral efficiency, e.g., as described in connection with 812 of FIG. 8. For example, the selection component 1042 may compare the first measurement, the first estimation, and the second estimation. The selection component 1042 may select the non-ML CSI feedback scheme when the second spectral efficiency is greater than the first spectral efficiency, but may select the ML CSI feedback scheme when the second spectral efficiency is less than the first spectral efficiency.

In some aspects, where the first measurement is greater than both the first and second estimations (which may be similar or approximately equal), the selection component 1042 may determine that the ML model is causing inaccurate reconstruction of CSI reports. For example, an ML model mismatch of the encoder and decoder may be degrading network performance as represented via spectral efficiency. Potentially, CSI reporting between the UE 104 and the apparatus 1002 may fall back to ML-unassisted CSI reporting.

In some other aspects, the first measurement may be similar or approximately equal to the second estimation, and the first measurement and the second estimation may be greater than the first estimation. In such other aspects, the selection component 1042 may determine that the ML model of the decoder may provide some degree of accuracy with respect to CSI used to recover messages, but channel estimation may be degraded. The selection component 1042 may determine to reconfigure the ML model, such as by adjusting weights, parameters, features, and/or other characteristics of the ML model.

In still further aspects, the selection component 1042 may determine that the first and second estimations may be similar or approximately equal, with both being greater than the first measurement. In such further aspects, the selection component 1042 may determine that the ML model improves the spectral efficiency relative to non-ML CSI feedback schemes.

The transmission component 1034 may be configured to transmit, to the UE 104, an instruction indicating the selected one of the ML CSI feedback scheme or the non-ML CSI feedback scheme, e.g., as described in connection with 814 of FIG. 8. In some aspects, the instruction may be transmitted in at least one of a MAC CE and/or an RRC signaling message.

The communication manager 1032 may further include a reconfiguration component 1044 that may be configured to reconfigure an ML model associated with the ML CSI feedback scheme, e.g., as described in connection with 816 of FIG. 8. For example, the reconfiguration component 1044 may calculate, compute, or otherwise determine one or more weights, biases, and/or other parameters of the ML model so that the channel between the UE 104 and the network node can be more accurately estimated and spectrum resources may be more effectively utilized. In some aspects, the reconfiguration component 1044 may identify one or more nodes associated with the ML model that contributed to inaccuracies in CSI reporting. The reconfiguration component 1044 may adjust weights and/or biases of the one or more identified nodes.

The reception component 1030 may be configured to receive, from the UE 104, CSI feedback that is associated with the selected one of the ML CSI feedback scheme or the non-ML CSI feedback scheme, e.g., as described in connection with 818 of FIG. 8. For example, when the ML CSI feedback scheme is selected, the apparatus 1002 may decode CSI based on an ML model, such as an ML model that decodes or estimates qualities or characteristics of a channel matrix that represents the channel between the UE 104 and the network node. Illustratively, one or more elements of a channel matrix may be decoded, estimated, or otherwise influenced using the ML model or another AI mechanism.

However, when the non-ML CSI feedback scheme is selected, the apparatus 1002 may rely on CSI feedback from the UE 104 without the assistance of the ML model or other AI-assisted mechanism. For example, the apparatus 1002 may include a component that is configured to reconstruct a channel matrix in which none of the elements results from the output of a neural network or other AI-assisted mechanism. In some instances, the non-ML CSI feedback scheme may be implemented as legacy (e.g., known) CSI feedback scheme.

The apparatus 1002 may include additional components that perform some or all of the blocks, operations, signaling, etc. of the algorithm(s) in the aforementioned call flow diagram and/or flowchart of FIGS. 6 and 8, respectively. As such, some or all of the blocks, operations, signaling, etc. in the aforementioned call flow diagram and/or flowchart of FIGS. 6 and 8, respectively, may be performed by a component and the apparatus 1002 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the baseband unit 1004, includes means for selecting one of an ML CSI feedback scheme associated with a first spectral efficiency or a non-ML CSI feedback scheme associated with a second spectral efficiency to be used for CSI feedback by a UE; means for transmitting, to the UE, an instruction indicating the selected one of the ML CSI feedback scheme or the non-ML CSI feedback scheme; and means for receiving, from the UE, the CSI feedback that is associated with the selected one of the ML CSI feedback scheme or the non-ML CSI feedback scheme.

In one configuration, the apparatus 1002, and in particular the baseband unit 1004, may further include means for receiving, from the UE, a request to use the non-ML CSI feedback scheme for the CSI feedback, and the request indicates that the first spectral efficiency is less than the second spectral efficiency, and the one of the ML CSI feedback scheme or the non-ML CSI feedback scheme is selected based on the request.

In one configuration, the request is included in one of a MAC CE or UAI.

In one configuration, the request is associated with a reference CSI feedback scheme that is based on at least one of a payload size associated with the ML CSI feedback scheme or an RRC configuration message transmitted to the UE.

In one configuration, the apparatus 1002, and in particular the baseband unit 1004, may further include means for receiving, from the UE, at least one measurement indicating the second spectral efficiency; means for obtaining a first estimation associated with the first spectral efficiency using HARQ feedback for signaling transmitted to the UE on a PDSCH; and means for obtaining a second estimation associated with the first spectral efficiency using at least one of output of a decoder that includes an ML model or a CQI report that is based on ML CSI feedback, and the one of the ML CSI feedback scheme or the non-ML CSI feedback scheme is selected based on the at least one measurement indicating the second spectral efficiency, the first estimation, and the second estimation.

In one configuration, the non-ML CSI feedback scheme is selected when the at least one measurement indicating the second spectral efficiency is greater than the first estimation and the second estimation, and the ML CSI feedback scheme is selected when the at least one measurement indicating the second spectral efficiency is less than the first estimation and the second estimation.

In one configuration, the apparatus 1002, and in particular the baseband unit 1004, may further include means for transmitting, to the UE, a request for the at least one measurement indicating the second spectral efficiency, and the at least one measurement indicating the second spectral efficiency is received in response to the request for the at least one measurement.

In one configuration, the at least one measurement indicating the second spectral efficiency is included in a message that is associated with at least one of a periodicity or UAI.

In one configuration, the instruction is included in one of a MAC CE or an RRC signaling message.

In one configuration, the apparatus 1002, and in particular the baseband unit 1004, may further include means for reconfiguring an ML model associated with the ML CSI feedback scheme.

The aforementioned means may be one or more of the aforementioned components of the apparatus 1002 configured to perform the functions recited by the aforementioned means. As described supra, the apparatus 1002 may include the TX Processor 416, the RX Processor 470, and the controller/processor 475. As such, in one configuration, the aforementioned means may be the TX Processor 416, the RX Processor 470, and the controller/processor 475 configured to perform the functions recited by the aforementioned means.

The specific order or hierarchy of blocks or operations in each of the foregoing processes, flowcharts, and other diagrams disclosed herein is an illustration of example approaches. Based upon design preferences, the specific order or hierarchy of blocks or operations in each of the processes, flowcharts, and other diagrams may be rearranged, omitted, and/or contemporaneously performed without departing from the scope of the present disclosure. Further, some blocks or operations may be combined or omitted. The accompanying method claims present elements of the various blocks or operations in a sample order, and are not meant to be limited to the specific order or hierarchy presented.

The following example clauses are illustrative only and may be combined with aspects of other embodiments or teachings described herein, without limitation.

1. A method of wireless communication at a UE, including:
   receiving, from a network node, an instruction indicating one of an ML CSI feedback scheme associated with a first spectral efficiency or a non-ML CSI feedback scheme associated with a second spectral efficiency to be used for CSI feedback; and
   reporting the CSI feedback to the network node using the indicated one of the ML CSI feedback scheme or the non-ML CSI feedback scheme.

2. The method of clause 1, further including:
   comparing a first measurement associated with the first spectral efficiency and a second measurement associated with the second spectral efficiency, and the instruction indicating the one of the ML CSI feedback scheme or the non-ML CSI feedback scheme is based on the comparing the first measurement and the second measurement.
3. The method of clause 2, further including:
obtaining the first measurement based on at least one of a rank, MCS, or BLER associated with signaling received from the network node on a PDSCH; and obtaining the second measurement based on signaling received on at least one of a CMR or an IMR associated with a reference CSI feedback scheme.
4. The method of clause 3, and the reference CSI feedback scheme is based on at least one of a payload size associated with the ML CSI feedback scheme or an RRC configuration message received from the network node.
5. The method of clause 4, further including:
transmitting, to the network node, a request to use the non-ML CSI feedback scheme for the CSI feedback when the first measurement is less than the second measurement, and the instruction is received in response to the request.
6. The method of clause 5, and the request is included in one of a MAC CE or UAI.
7. The method of clause 1, further including:
transmitting, to the network node, information indicating the second spectral efficiency, and the instruction is associated with the information indicating the second spectral efficiency.
8. The method of clause 7, further including:
receiving, from the network node, a request for the information indicating the second spectral efficiency, and the information indicating the second spectral efficiency is transmitted in response to the request.
9. The method of either of clauses 7 or 8, and the information indicating the second spectral efficiency is transmitted to the network node when a request for the information indicating the second spectral efficiency is absent.
10. The method of any of clauses 1 to 9, and the instruction is included in one of a MAC CE or an RRC signaling message.
11. A method of wireless communication at a network node, including:
selecting one of an ML CSI feedback scheme associated with a first spectral efficiency or a non-ML CSI feedback scheme associated with a second spectral efficiency to be used for CSI feedback by a UE;
transmitting, to the UE, an instruction indicating the selected one of the ML CSI feedback scheme or the non-ML CSI feedback scheme; and
receiving, from the UE, the CSI feedback that is associated with the selected one of the ML CSI feedback scheme or the non-ML CSI feedback scheme.
12. The method of clause 11, further including:
receiving, from the UE, a request to use the non-ML CSI feedback scheme for the CSI feedback, and the request indicates that the first spectral efficiency is less than the second spectral efficiency, and the one of the ML CSI feedback scheme or the non-ML CSI feedback scheme is selected based on the request.
13. The method of clause 12, and the request is included in one of a MAC CE or UAI.
14. The method of either of clauses 12 or 13, and the request is associated with a reference CSI feedback scheme that is based on at least one of a payload size associated with the ML CSI feedback scheme or an RRC configuration message transmitted to the UE.

15. The method of any of clauses 12 to 14, further including:
receiving, from the UE, at least one measurement indicating the second spectral efficiency;
obtaining a first estimation associated with the first spectral efficiency using HARQ feedback for signaling transmitted to the UE on a PDSCH;
obtaining a second estimation associated with the first spectral efficiency using at least one of output of a decoder that includes an ML model or a CQI report that is based on ML CSI feedback, and
the one of the ML CSI feedback scheme or the non-ML CSI feedback scheme is selected based on the at least one measurement indicating the second spectral efficiency, the first estimation, and the second estimation.
16. The method of clause 15, and the non-ML CSI feedback scheme is selected when the at least one measurement indicating the second spectral efficiency is greater than the first estimation and the second estimation, and the ML CSI feedback scheme is selected when the at least one measurement indicating the second spectral efficiency is less than the first estimation and the second estimation.
17. The method of either of clauses 15 or 16, further including:
transmitting, to the UE, a request for the at least one measurement indicating the second spectral efficiency, and the at least one measurement indicating the second spectral efficiency is received in response to the request for the at least one measurement.
18. The method of any of clauses 15 to 17, and the at least one measurement indicating the second spectral efficiency is included in a message that is associated with at least one of a periodicity or UAI.
19. The method of any of clauses 11 to 18, and the instruction is included in one of a MAC CE or an RRC signaling message.
20. The method of any of clauses 11 to 19, further including:
reconfiguring an ML model associated with the ML CSI feedback scheme.
21. An apparatus for wireless communication at a UE, including:
a memory; and
at least one processor coupled to the memory and configured to:
receive, from a network node, an instruction indicating one of an ML CSI feedback scheme associated with a first spectral efficiency or a non-ML CSI feedback scheme associated with a second spectral efficiency to be used for CSI feedback; and
report the CSI feedback to the network node using the indicated one of the ML CSI feedback scheme or the non-ML CSI feedback scheme.
22. The apparatus of clause 21, and the at least one processor is further configured to:
compare a first measurement associated with the first spectral efficiency and a second measurement associated with the second spectral efficiency, and the instruction indicating the one of the ML CSI feedback scheme or the non-ML CSI feedback scheme is based on the comparing the first measurement and the second measurement.
23. The apparatus of clause 22, and the at least one processor is further configured to:
obtain the first measurement based on at least one of a rank, MCS, or BLER associated with signaling received from the network node on a PDSCH; and
obtain the second measurement based on signaling received on at least one of a CMR or an IMR associated with a reference CSI feedback scheme.

24. The apparatus of clause 23, and the reference CSI feedback scheme is based on at least one of a payload size associated with the ML CSI feedback scheme or an RRC configuration message received from the network node.

25 The apparatus of clause 24, and the at least one processor is further configured to:
transmit, to the network node, a request to use the non-ML CSI feedback scheme for the CSI feedback when the first measurement is less than the second measurement, and the instruction is received in response to the request.

26. The apparatus of clause 25, and the request is included in one of a MAC CE or UAI.

27. The apparatus of clause 21, and the at least one processor is further configured to:
transmit, to the network node, information indicating the second spectral efficiency, and the instruction is associated with the information indicating the second spectral efficiency.

28. The apparatus of clause 27, and the at least one processor is further configured to:
receive, from the network node, a request for the information indicating the second spectral efficiency, and the information indicating the second spectral efficiency is transmitted in response to the request.

29. The apparatus of either of clauses 27 or 28, and the information indicating the second spectral efficiency is transmitted to the network node when a request for the information indicating the second spectral efficiency is absent.

30. The apparatus of any of clauses 21 to 29, and the instruction is included in one of a MAC CE or an RRC signaling message.

31. An apparatus for wireless communication at a network node, including:
a memory; and
at least one processor coupled to the memory and configured to:
select one of an ML CSI feedback scheme associated with a first spectral efficiency or a non-ML CSI feedback scheme associated with a second spectral efficiency to be used for CSI feedback by a UE;
transmit, to the UE, an instruction indicating the selected one of the ML CSI feedback scheme or the non-ML CSI feedback scheme; and
receive, from the UE, the CSI feedback that is associated with the selected one of the ML CSI feedback scheme or the non-ML CSI feedback scheme.

32. The apparatus of clause 31, and the at least one processor is further configured to:
receive, from the UE, a request to use the non-ML CSI feedback scheme for the CSI feedback, and the request indicates that the first spectral efficiency is less than the second spectral efficiency, and the one of the ML CSI feedback scheme or the non-ML CSI feedback scheme is selected based on the request.

33. The apparatus of clause 32, and the request is included in one of a MAC CE or UAI.

34. The apparatus of either of clauses 32 or 33, and the request is associated with a reference CSI feedback scheme that is based on at least one of a payload size associated with the ML CSI feedback scheme or an RRC configuration message transmitted to the UE.

35. The apparatus of any of clauses 32 to 34, and the at least one processor is further configured to:
receive, from the UE, at least one measurement indicating the second spectral efficiency;
obtain a first estimation associated with the first spectral efficiency using HARQ feedback for signaling transmitted to the UE on a PDSCH;
obtain a second estimation associated with the first spectral efficiency using at least one of output of a decoder that includes an ML model or a CQI report that is based on ML CSI feedback, and
the one of the ML CSI feedback scheme or the non-ML CSI feedback scheme is selected based on the at least one measurement indicating the second spectral efficiency, the first estimation, and the second estimation.

36. The apparatus of clause 35, and the non-ML CSI feedback scheme is selected when the at least one measurement indicating the second spectral efficiency is greater than the first estimation and the second estimation, and the ML CSI feedback scheme is selected when the at least one measurement indicating the second spectral efficiency is less than the first estimation and the second estimation.

37. The apparatus of either of clauses 35 or 36, and the at least one processor is further configured to:
transmit, to the UE, a request for the at least one measurement indicating the second spectral efficiency, and the at least one measurement indicating the second spectral efficiency is received in response to the request for the at least one measurement.

38. The apparatus of any of clauses 35 to 37, and the at least one measurement indicating the second spectral efficiency is included in a message that is associated with at least one of a periodicity or UAI.

39. The apparatus of any of clauses 31 to 38, and the instruction is included in one of a MAC CE or an RRC signaling message.

40. The apparatus of any of clauses 31 to 39, and the at least one processor is further configured to:
reconfigure an ML model associated with the ML CSI feedback scheme.

The previous description is provided to enable one of ordinary skill in the art to practice the various aspects described herein. Various modifications to these aspects will be readily apparent to those having ordinary skill in the art, and the generic principles defined herein may be applied to other aspects. Thus, the claims are not intended to be limited to the aspects shown herein, but is to be accorded the full scope consistent with the language. Thus, the language employed herein is not intended to limit the scope of the claims to only those aspects shown herein, but is to be accorded the full scope consistent with the language of the claims.

As one example, the language "determining" may encompass a wide variety of actions, and so may not be limited to the concepts and aspects explicitly described or illustrated by the present disclosure. In some contexts, "determining" may include calculating, computing, processing, measuring, deriving, investigating, looking up (e.g., looking up in a table, a database or another data structure), ascertaining, resolving, selecting, choosing, establishing, and so forth. In some other contexts, "determining" may include communication and/or memory operations/procedures through which information or value(s) are acquired, such as "receiving" (e.g., receiving information), "accessing" (e.g., accessing data in a memory), "detecting," and the like.

As another example, reference to an element in the singular is not intended to mean "one and only one" unless specifically stated, but rather "one or more." Further, terms such as "if," "when," and "while" should be interpreted to mean "under the condition that" rather than imply an immediate temporal relationship or reaction. That is, these phrases, e.g., "when," do not imply an immediate action in response to or during the occurrence of an action or event, but rather imply that if a condition is met then another action or event will occur, but without requiring a specific or immediate time constraint or direct correlation for the other action or event to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   receiving, from a network node, an instruction indicating one of a machine-learning (ML) channel state information (CSI) feedback scheme associated with a first spectral efficiency or a non-ML CSI feedback scheme associated with a second spectral efficiency to be used for CSI feedback, wherein the instruction indicating the one of the ML CSI feedback scheme or the non-ML CSI feedback scheme is based on a comparison of a first measurement associated with the first spectral efficiency and a second measurement associated with the second spectral efficiency; and
   reporting the CSI feedback to the network node using the indicated one of the ML CSI feedback scheme or the non-ML CSI feedback scheme.

2. The method of claim 1, further comprising:
   obtaining the first measurement based on at least one of a rank, modulation and coding scheme (MCS), or block error rate (BLER) associated with signaling received from the network node on a physical downlink shared channel (PDSCH); and
   obtaining the second measurement based on signaling received on at least one of a channel measurement resource (CMR) or an interference measurement resource (IMR) associated with a reference CSI feedback scheme.

3. The method of claim 2, wherein the reference CSI feedback scheme is based on at least one of a payload size associated with the ML CSI feedback scheme or a radio resource control (RRC) configuration message received from the network node.

4. The method of claim 3, further comprising:
   transmitting, to the network node, a request to use the non-ML CSI feedback scheme for the CSI feedback when the first measurement is less than the second measurement, wherein the instruction is received in response to the request.

5. The method of claim 4, wherein the request is included in one of a medium access control (MAC) control element (CE) or UE assistance information (UAI).

6. The method of claim 1, further comprising:
   transmitting, to the network node, information indicating the second spectral efficiency, wherein the instruction is associated with the information indicating the second spectral efficiency.

7. The method of claim 6, further comprising:
   receiving, from the network node, a request for the information indicating the second spectral efficiency, wherein the information indicating the second spectral efficiency is transmitted in response to the request.

8. The method of claim 6, wherein the information indicating the second spectral efficiency is transmitted to the network node when a request for the information indicating the second spectral efficiency is absent.

9. The method of claim 1, wherein the instruction is included in one of a medium access control (MAC) control element (CE) or a radio resource control (RRC) signaling message.

10. A method of wireless communication at a network node, comprising:
    selecting one of a machine-learning (ML) channel state information (CSI) feedback scheme associated with a first spectral efficiency or a non-ML CSI feedback scheme associated with a second spectral efficiency to be used for CSI feedback by a user equipment (UE);
    transmitting, to the UE, an instruction indicating the selected one of the ML CSI feedback scheme or the non-ML CSI feedback scheme; and
    receiving, from the UE, the CSI feedback that is associated with the selected one of the ML CSI feedback scheme or the non-ML CSI feedback scheme,
    wherein the instruction indicating the one of the ML CSI feedback scheme or the non-ML CSI feedback scheme is based on a comparison of a first measurement associated with the first spectral efficiency and a second measurement associated with the second spectral efficiency.

11. The method of claim 10, further comprising:
    receiving, from the UE, a request to use the non-ML CSI feedback scheme for the CSI feedback, wherein the request indicates that the first spectral efficiency is less than the second spectral efficiency, and wherein the one of the ML CSI feedback scheme or the non-ML CSI feedback scheme is selected based on the request.

12. The method of claim 11, wherein the request is included in one of a medium access control (MAC) control element (CE) or UE assistance information (UAI).

13. The method of claim 11, wherein the request is associated with a reference CSI feedback scheme that is based on at least one of a payload size associated with the ML CSI feedback scheme or a radio resource control (RRC) configuration message transmitted to the UE.

14. The method of claim 11, further comprising:
    receiving, from the UE, at least one measurement indicating the second spectral efficiency;
    obtaining a first estimation associated with the first spectral efficiency using hybrid automatic repeat request (HARQ) feedback for signaling transmitted to the UE on a physical downlink shared channel (PDSCH);

obtaining a second estimation associated with the first spectral efficiency using at least one of output of a decoder that includes an ML model or a channel quality indicator (CQI) report that is based on ML CSI feedback, wherein the one of the ML CSI feedback scheme or the non-ML CSI feedback scheme is selected based on the at least one measurement indicating the second spectral efficiency, the first estimation, and the second estimation.

15. The method of claim 14, wherein the non-ML CSI feedback scheme is selected when the at least one measurement indicating the second spectral efficiency is greater than the first estimation and the second estimation, and wherein the ML CSI feedback scheme is selected when the at least one measurement indicating the second spectral efficiency is less than the first estimation and the second estimation.

16. The method of claim 14, further comprising:
transmitting, to the UE, a request for the at least one measurement indicating the second spectral efficiency, wherein the at least one measurement indicating the second spectral efficiency is received in response to the request for the at least one measurement.

17. The method of claim 14, wherein the at least one measurement indicating the second spectral efficiency is included in a message that is associated with at least one of a periodicity or UE assistance information (UAI).

18. The method of claim 10, wherein the instruction is included in one of a medium access control (MAC) control element (CE) or a radio resource control (RRC) signaling message.

19. The method of claim 10, further comprising:
reconfiguring an ML model associated with the ML CSI feedback scheme.

20. An apparatus for wireless communication at a user equipment (UE), comprising:
a memory; and
at least one processor coupled to the memory and configured to:
receive, from a network node, an instruction indicating one of a machine-learning (ML) channel state information (CSI) feedback scheme associated with a first spectral efficiency or a non-ML CSI feedback scheme associated with a second spectral efficiency to be used for CSI feedback, wherein the instruction indicating the one of the ML CSI feedback scheme or the non-ML CSI feedback scheme is based on a comparison of a first measurement associated with the first spectral efficiency and a second measurement associated with the second spectral efficiency; and
report the CSI feedback to the network node using the indicated one of the ML CSI feedback scheme or the non-ML CSI feedback scheme.

21. The apparatus of claim 20, wherein the at least one processor is further configured to:
obtain the first measurement based on at least one of a rank, modulation and coding scheme (MCS), or block error rate (BLER) associated with signaling received from the network node on a physical downlink shared channel (PDSCH); and
obtain the second measurement based on signaling received on at least one of a channel measurement resource (CMR) or an interference measurement resource (IMR) associated with a reference CSI feedback scheme.

22. The apparatus of claim 21, wherein the reference CSI feedback scheme is based on at least one of a payload size associated with the ML CSI feedback scheme or a radio resource control (RRC) configuration message received from the network node.

23. The apparatus of claim 22, wherein the at least one processor is further configured to:
transmit, to the network node, a request to use the non-ML CSI feedback scheme for the CSI feedback when the first measurement is less than the second measurement, wherein the instruction is received in response to the request.

24. The apparatus of claim 23, wherein the request is included in one of a medium access control (MAC) control element (CE) or UE assistance information (UAI).

25. The apparatus of claim 20, wherein the at least one processor is further configured to:
transmit, to the network node, information indicating the second spectral efficiency, wherein the instruction is associated with the information indicating the second spectral efficiency.

26. The apparatus of claim 25, wherein the at least one processor is further configured to:
receive, from the network node, a request for the information indicating the second spectral efficiency, wherein the information indicating the second spectral efficiency is transmitted in response to the request.

27. The apparatus of claim 25, wherein the information indicating the second spectral efficiency is transmitted to the network node when a request for the information indicating the second spectral efficiency is absent.

28. The apparatus of claim 20, wherein the instruction is included in one of a medium access control (MAC) control element (CE) or a radio resource control (RRC) signaling message.

29. An apparatus for wireless communication at a network node, comprising:
a memory; and
at least one processor coupled to the memory and configured to:
select one of a machine-learning (ML) channel state information (CSI) feedback scheme associated with a first spectral efficiency or a non-ML CSI feedback scheme associated with a second spectral efficiency to be used for CSI feedback by a user equipment (UE);
transmit, to the UE, an instruction indicating the selected one of the ML CSI feedback scheme or the non-ML CSI feedback scheme; and
receive, from the UE, the CSI feedback that is associated with the selected one of the ML CSI feedback scheme or the non-ML CSI feedback scheme,
wherein the instruction indicating the one of the ML CSI feedback scheme or the non-ML CSI feedback scheme is based on a comparison of a first measurement associated with the first spectral efficiency and a second measurement associated with the second spectral efficiency.

30. The apparatus of claim 29, wherein the at least one processor is further configured to:
receive, from the UE, a request to use the non-ML CSI feedback scheme for the CSI feedback, wherein the request indicates that the first spectral efficiency is less than the second spectral efficiency, and wherein the one of the ML CSI feedback scheme or the non-ML CSI feedback scheme is selected based on the request.

31. The apparatus of claim 30, wherein the request is included in one of a medium access control (MAC) control element (CE) or UE assistance information (UAI).

32. The apparatus of claim 30, wherein the request is associated with a reference CSI feedback scheme that is based on at least one of a payload size associated with the ML CSI feedback scheme or a radio resource control (RRC) configuration message transmitted to the UE.

33. The apparatus of claim 30, wherein the at least one processor is further configured to:
receive, from the UE, at least one measurement indicating the second spectral efficiency;
obtain a first estimation associated with the first spectral efficiency using hybrid automatic repeat request (HARQ) feedback for signaling transmitted to the UE on a physical downlink shared channel (PDSCH);
obtain a second estimation associated with the first spectral efficiency using at least one of output of a decoder that includes an ML model or a channel quality indicator (CQI) report that is based on ML CSI feedback, wherein
the one of the ML CSI feedback scheme or the non-ML CSI feedback scheme is selected based on the at least one measurement indicating the second spectral efficiency, the first estimation, and the second estimation.

34. The apparatus of claim 33, wherein the non-ML CSI feedback scheme is selected when the at least one measurement indicating the second spectral efficiency is greater than the first estimation and the second estimation, and wherein the ML CSI feedback scheme is selected when the at least one measurement indicating the second spectral efficiency is less than the first estimation and the second estimation.

35. The apparatus of claim 33, wherein the at least one processor is further configured to:
transmit, to the UE, a request for the at least one measurement indicating the second spectral efficiency, wherein the at least one measurement indicating the second spectral efficiency is received in response to the request for the at least one measurement.

36. The apparatus of claim 33, wherein the at least one measurement indicating the second spectral efficiency is included in a message that is associated with at least one of a periodicity or UE assistance information (UAI).

37. The apparatus of claim 29, wherein the instruction is included in one of a medium access control (MAC) control element (CE) or a radio resource control (RRC) signaling message.

38. The apparatus of claim 29, wherein the at least one processor is further configured to:
reconfigure an ML model associated with the ML CSI feedback scheme.

* * * * *